(12) United States Patent
Park et al.

(10) Patent No.: US 8,447,797 B2
(45) Date of Patent: May 21, 2013

(54) MIMO SYSTEM METHOD AND DEVICE USING SORTED QR-DECOMPOSITION (SQRD) FOR DETECTING TRANSMISSION SIGNAL WITH DIVISION DETECTION

(75) Inventors: In-Sook Park, Daejeon (KR); Byung-Jang Jeong, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1047 days.

(21) Appl. No.: 12/514,291

(22) PCT Filed: Jun. 21, 2007

(86) PCT No.: PCT/KR2007/003018
§ 371 (c)(1),
(2), (4) Date: May 8, 2009

(87) PCT Pub. No.: WO2008/056866
PCT Pub. Date: May 15, 2008

(65) Prior Publication Data
US 2010/0042666 A1 Feb. 18, 2010

(30) Foreign Application Priority Data

Nov. 8, 2006 (KR) .................. 10-2006-0109886

(51) Int. Cl.
*G06F 17/16* (2006.01)
(52) U.S. Cl.
USPC ............ 708/212; 708/490; 375/267; 375/348
(58) Field of Classification Search .................. 708/490, 708/212; 375/348, 267
See application file for complete search history.

(56) References Cited

U.S. PATENT DOCUMENTS 7,668,268 B2 * 2/2010 Heiskala ................ 375/348
8,270,432 B2 * 9/2012 Kim ...................... 370/465
(Continued)

FOREIGN PATENT DOCUMENTS
KR 10-2004-0081713 A 9/2004

OTHER PUBLICATIONS

Kimura et al., Multiple-QR-Decomposition Assisted Group Detection for Reduced-Complexity-and-Latency MIMO-OFDM Receivers, 2005, Personal, Indoor and Mobile Radio Communications, 2006 IEEE 17th International Symposium on, pp. 1-5.*

(Continued)

*Primary Examiner* — Tammara Peyton
(74) *Attorney, Agent, or Firm* — Kile Park Reed & Houtteman PLLC

(57) ABSTRACT

The present invention relates to a method and device for detecting a transmission signal on the basis of a received signal by applying a division and detection algorithm. An embodiment of the invention provides a method of detecting a transmission signal including: obtaining a unitary matrix and an upper triangular matrix by performing a sorted QR-decomposition algorithm with respect to a matrix indicating a channel state; calculating a vector y by multiplying a transpose matrix of the unitary matrix by the received signal Y; dividing the upper triangular matrix R into a plurality of sub-upper triangular matrices and dividing the calculated vector y into a plurality of sub-vectors so as to correspond to the divided plurality of sub-upper triangular matrices; and detecting a lattice point corresponding to each of the divided sub-vectors using the divided plurality of sub-upper triangular matrices.

16 Claims, 19 Drawing Sheets

U.S. PATENT DOCUMENTS

| | | | |
|---|---|---|---|
| 8,320,510 B2 * | 11/2012 | Kim et al. | 375/347 |
| 2004/0181419 A1 | 9/2004 | Davis et al. | |
| 2007/0226287 A1 * | 9/2007 | Lin et al. | 708/490 |
| 2008/0049863 A1 * | 2/2008 | Heiskala | 375/267 |

OTHER PUBLICATIONS

Singh et al., A Fixed Point Implementation for QR Decomposition, 2006, Design, Application, Integration and Software, 2006 IEEE Dallas/CAS Workshop on, pp. 75-78.*

Yao et al. (Lattice-reduction aided detectors for MIMO communicatoin systems) Proceedings of IEEE Globalcom Nov. 2002; pp. 424-428.*

International Search Report of International Application No. PCT/KR2007/003018 filed on Jun. 21, 2007.

Dirk Wubben, Ronald Bohnke, Volker Kuhn, and Karl-Dirk Kammeyer, MMSE-Based Lattice-Reduction for Near-ML Dection of MIMO Systems, Mar. 18-19, 2004, pp. 106-113, IGT Workshop on Smart Antennas, Munich, Germany.

Zhiheng Guo, Yi Wang, Lihua Li, Xiaofeng Tao, Ping Zhang and Hiroshi Harada, A Hybrid Detection Algorithm for MIMO Systems, Jun. 25-28, 2006, vol. 2, pp. 883-887, International Conference on Communications, Circuits and Systems.

Written Opinion of the International Searching Authority of International Application No. PCT/KR2007/003018 filed on Jun. 21, 2007.

* cited by examiner

US 8,447,797 B2

MIMO SYSTEM METHOD AND DEVICE USING SORTED QR-DECOMPOSITION (SQRD) FOR DETECTING TRANSMISSION SIGNAL WITH DIVISION DETECTION

BACKGROUND OF THE INVENTION (a) Field of the Invention

The present invention relates to a transmission signal detection method and device using division detection. In particular, the present invention relates to an adaptive transmission signal detection method and device that are capable of sufficiently reducing error probability of a detected signal and simultaneously reducing an amount of calculation when a transmission signal vector is detected from a received signal vector corresponding to a transmission signal vector that includes a plurality of signals and uses high modulation, and the number of signals included in the received signal vector and the transmission signal vector is large.

(b) Description of the Related Art

A receiving terminal of a communication system detects a transmission signal vector X having M complex numbers from a signal vector Y having N complex numbers measured in the receiving terminal, wherein the transmission signal vector X should be close to an original signal.

Generally, the vector Y is the same as a vector obtained by multiplying the vector X by an N×M matrix and then adding a noise vector to the multiplied value.

The N×M matrix to be multiplied by the vector X is a matrix that is assumed and known in the receiving terminal, and the noise vector is assumed to be Gaussian noise.

If a signal constellation used in the transmission is 2Q-QAM, each element included in the X is included in the 2Q-QAM. When the vector X is obtained by using a maximum likelihood detection method which is known to have the best performance as a signal detection method, a number of multiplications required is at least $N \times (M+1) \times 2^{M \times Q}$.

Furthermore, when a log likelihood ratio (LLR) is calculated in order to calculate an input value of a channel decoder, the number of multiplications required is $$\frac{3}{2} \times N \times (M+1) \times 2^{M \times Q}.$$

Therefore, when the values of M and Q become large, the amount of calculation increases in geometric progression, and there is a drawback in that it is difficult to apply to a system.

In order to cope with the drawback, methods of performing calculation in a local range where the maximum likelihood point is expected to exist have been proposed in recent years.

One of the representative methods is a sphere decoding method. As another access method, a QRM-MLD (QR decomposition and M-algorithm) method is proposed. The QRM-MLD method has performance that is close to the maximum likelihood detection.

However, those proposed methods have limits in improving the complexity of the calculation when a number of signals are included in the received signal vector and the transmission signal vector.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for detecting a transmission signal from a received signal and a device thereof having advantages of securing a signal detection performance equal to or higher than a predetermined level and reducing the complexity of a calculation process for simultaneous signal detection by considering an amount of calculation for a signal detection performance in a multiple input multiple output (MIMO) system.

An exemplary embodiment of the present invention provides a method of detecting a transmission signal from a received signal in an MIMO system, the method including: obtaining a unitary matrix Q and an upper triangular matrix R by performing a sorted QR-decomposition (SQRD) algorithm with respect to a matrix B indicating a channel state; calculating a vector y by multiplying an transpose matrix $Q^t$ of the unitary matrix Q by the received signal Y; dividing the upper triangular matrix R into a plurality of sub-upper triangular matrices and dividing the calculated vector y into a plurality of sub-vectors so as to correspond to the divided plurality of sub-upper triangular matrices; and detecting a lattice point corresponding to each of the divided sub-vectors using the divided plurality of sub-upper triangular matrices.

Another embodiment of the present invention provides a device for detecting a transmission signal from a received signal in an MIMO system, the device including: a QR decomposition unit that obtains a unitary matrix Q and an upper triangular matrix R by performing an SQRD algorithm with respect to a matrix B indicating a channel state; a vector calculator that calculates a vector y by multiplying a transpose matrix $Q^t$ of the unitary matrix Q by the received signal Y; a divider that divides the upper triangular matrix R input from the QR decomposer into a plurality of sub-upper triangular matrices and divides the calculated vector y into a plurality of sub-vectors so as to correspond to the divided plurality of sub-upper triangular matrices; and a detector that detects a lattice point corresponding to each of the divided sub-vectors using the divided plurality of sub-upper triangular matrices input from the divider.

DETAILED DESCRIPTION OF THE EMBODIMENTS

Figure 1:
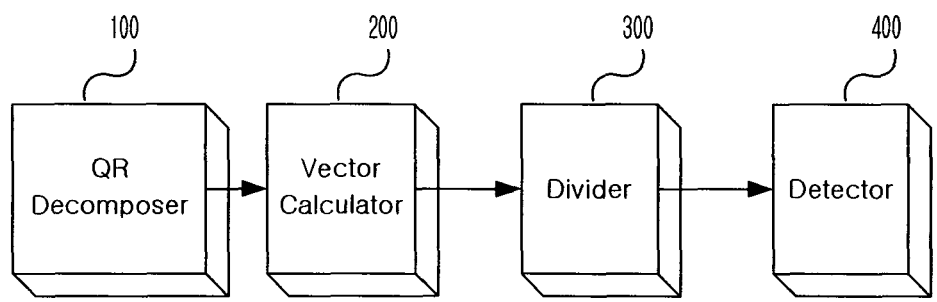
FIG. 1 is a block diagram illustrating the structure of a transmission signal detection device according to a first exemplary embodiment of the present invention.

Hereinafter, the present invention now will be described more fully with reference to the accompanying drawings, in which preferred embodiments of the invention are shown as those skilled in the art would realize. As those skilled in the art would realize, the described embodiments may be modified in various different ways, all without departing from the spirit or scope of the present invention. Further, for more apparent description of the present invention with reference to the drawings, parts that have no relationship with the description are omitted and similar parts are represented by the same reference numerals through the specification.

In addition, a part that includes a constituent element means that the part may further include other constituent elements rather than only the constituent element.

Further, the term "module" described in this specification means one unit that processes a specific function or an operation and may be implemented by hardware, software, or a combination of hardware and software.

Hereinafter, a method and device for detecting a transmission signal to which a division detection method is applied according to exemplary embodiments of the present invention will be described in detail with reference to the accompanying drawings.

First, an exemplary embodiment of the present invention is applied to a multiple input multiple output (MIMO) system that includes multiple transmission/received signals. Here, the present invention is related to a division detection method and a device realizing the same that are capable of assuming a transmission vector from a reception vector or reliability value of each bit included in a transmission vector so as to adjust the performance to be equal to or higher than BLAST (Bell Laboratories Layered Space Time) and adjust an amount of calculation for detection in accordance with a target performance. When the target performance is low, the amount of calculation decreases.

A system model to be used may be defined as follows.

In the MIMO system having $M_t$ number of transmitting antennas and $M_r$ number of receiving antennas and using a 2Q-QAM signal constellation, a math model of Equation 1 is obtained so as to detect the transmission signal.

$$Y=BX+Z, Y=[Y_1 \ldots Y_N]^t, X=[X_1 \ldots X_M]^t, Z=[Z_1 \ldots Z_N]^t \quad \text{[Equation 1]}$$

Here, Y is a column vector that includes N number of signals known in the receiving terminal, X is a column vector that includes M number of columns as signals to obtain, and B is an N×M matrix assumed and calculated in the receiving terminal. B is sometimes the same as a channel matrix, but is generally different from the channel matrix. Each value of elements of B is represented by a complex number.

M and N may be the same or different from each other. Z is a vector including N number of probability variables. Generally, an average of Z is a zero vector, and each of $Z_1, Z_2, \ldots, Z_N$ are independent from each other.

When $Z_i$ ($1 \leq i \leq N$) is in a Gaussian distribution, a value of X that makes a likelihood value with respect to the given Y and B be the same as a value of X makes a distance between Y and BX the smallest.

When each element included in X is included in 2Q-QAM, all the capable lattice points are substituted into X so as to calculate a distance between Y and BX. In order to find a value of X that makes the distance between Y and BX the smallest, Equation 1 should be performed with respect to 2MQ number of points. Therefore, when values of M and Q are large, the amount of calculation increases by geometric progression.

Accordingly, according to the exemplary embodiment of the present invention, when the values of M and Q are large, the performance may be deteriorated as compared with the performance of the maximum likelihood detection. However, even when the performance is deteriorated, the amount of calculation should be reduced by dividing and detecting the transmission signal vector. Performance of the method of detecting each of the divided signal vectors is similar to or the same as the performance of the maximum likelihood detection. A method in which the amount of calculation is the smallest should be selected under the same performance.

In order to divide and detect the transmission signal vector X, the transmission signal vector should be easily divided by modifying Equation 1, and divided sub-transmission signal vectors should be detected.

Next, the structure of the device for detecting a signal, which adopts the method of detecting the transmission signal based on above-described division detection, will be described.

FIG. 1 is a block diagram illustrating the structure of a transmission signal detection device according to a first exemplary embodiment of the present invention.

Referring to FIG. 1, a transmission signal detection device according to the division detection method includes a QR decomposer 100, a vector calculator 200, a divider 300, and a detector 400.

The QR decomposer 100 performs a sorted QR-decomposition (SQRD) algorithm to a matrix B that indicates a channel state so as to obtain a unitary matrix Q and an upper triangular matrix R.

At this time, the QR decomposer 100 applies SQRD or $$\begin{bmatrix} B \\ \sigma I_M \end{bmatrix}$$

to obtain $$\begin{bmatrix} B \\ \sigma I_M \end{bmatrix} = QR$$

where $\sigma$ is the reciprocal of the square root of a signal-to-noise ratio measured in the receiving terminal and $I_M$ is the identity matrix with the size of the signal vector to be detected.

Otherwise, the QR decomposer 100 rearranges the columns of the matrix B, representing the channel state, in increasing order of the Euclidean norms of the columns and then applies QR dcomposition on the rearranged matrix B to obtain B=QR.

Further, the QR decomposer 100 rearranges the columns of the matrix B, representing the channel state, in increasing order of the Euclidean norms of the columns and then applies QR dcomposition on the matrix $$\begin{bmatrix} B \\ \sigma I_M \end{bmatrix}$$

where $\sigma$ is the reciprocal of the square root of a signal-to-noise ratio measured in the receiving terminal and $I_M$ is the identity matrix with the size of the signal vector to be detected.

The vector calculator 200 calculates a vector y by multiplying a transpose matrix $Q^t$ of the unitary matrix Q by the received signal Y.

The divider 300 divides an upper triangular matrix R input by the QR decomposer 100 into a plurality of sub-upper triangular matrices and divides the vector y input from the vector calculator 200 into a plurality of vectors so as to correspond to the divided plurality of sub-upper triangular matrices.

The detector 400 detects the lattice point corresponding to each of the divided sub-vectors by using the plurality of sub-upper triangular matrices input from the divider 300.

Figure 2:
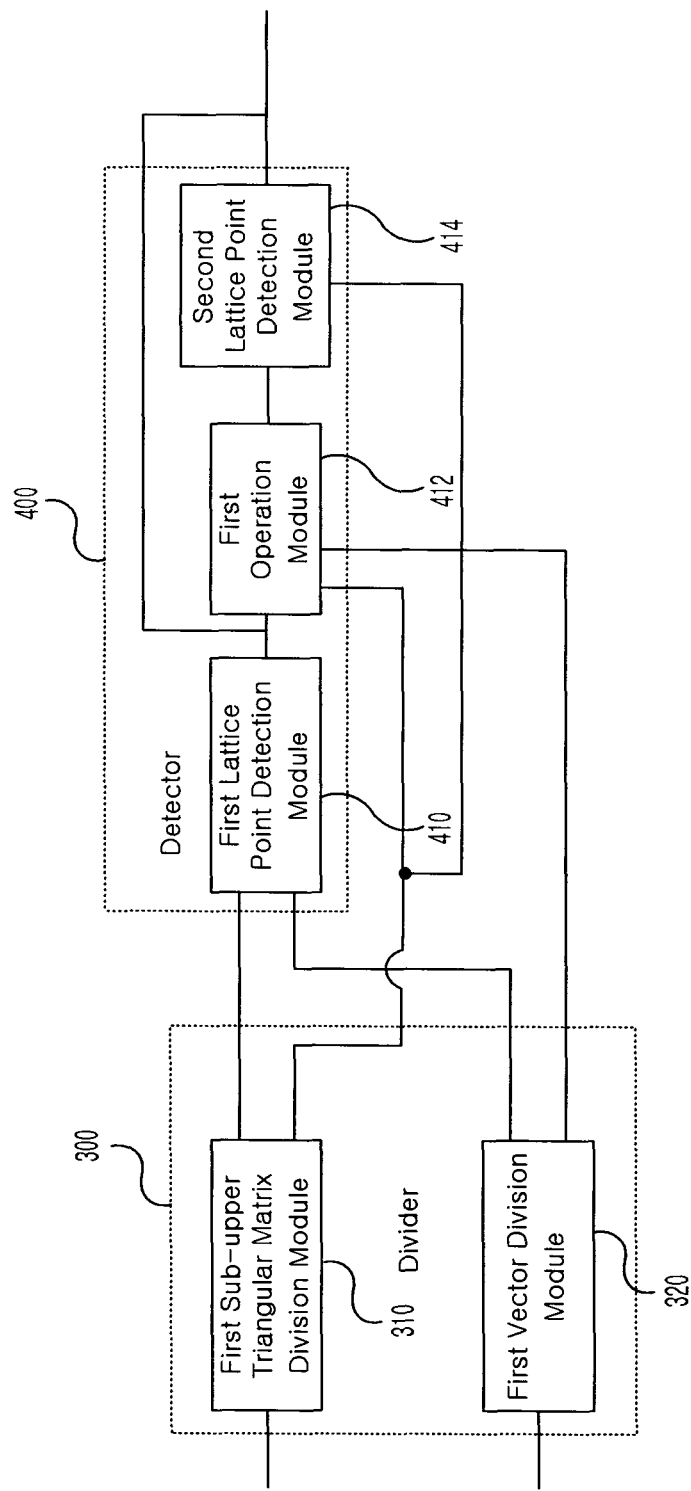
FIG. 2 is a block diagram illustrating a detailed structure of the transmission signal detection device according to the first exemplary embodiment of the present invention.

FIG. 2 is a block diagram illustrating a detailed structure of a divider 300 and a detector 400 according to the first exemplary embodiment of the present invention.

Referring to FIG. 2, the divider 300 includes a first sub-upper triangular matrix division module 310 and a first vector division module 320.

The first sub-upper triangular matrix division module 310 divides the upper triangular matrix R by a predetermined row $i_0$ determined on the basis of SNR or the number of rows and obtains an $(M-i_0) \times (M-i_0)$ submatrix and an $(i_0 \times M)$ submatrix of the upper triangular matrix R. That is, the first sub-upper triangular matrix division module 310 obtains a first sub-upper triangular matrix $bR[i_0]$ that includes elements from an $(i_0+1)$-th column to an M-th column included from an $(i_0+1)$-th row to an M-th row of the upper triangular matrix R and a second sub-upper triangular matrix $uR[i_0]$ that includes elements from a first column to an $i_0$-th column included from a first row to an $i_0$-th row of the upper triangular matrix R.

The first vector division module 320 divides the vector y into the first sub-vector $y_{[1]}$ including elements from the $(i_0+1)$-th row to M-th row and the second sub-vector $y_{[2]}$ including elements from a first row to the $i_0$-th row so as to correspond to each of the first sub-upper triangular matrix $bR[i_0]$ and the second sub-upper triangular matrix $uR[i_0]$.

The detector 400 includes a first lattice point detection module 410, a first operation module 412, and a second lattice point detection module 414.

The first lattice point detection module 410 detects a lattice point v in which the value of a product of the first sub-upper triangular matrix $bR[i_0]$ and the lattice point v is the closest to the first sub-vector $y_{[1]}$ in distance.

The first operation module 412 calculates a transformational second sub-vector $y'_{[2]}$ by eliminating a value of a product of the submatrix that includes elements from the $(i_0+1)$-th row to the M-th row of the second sub-upper triangular matrix $uR[i_0]$ and the lattice point v in the second sub-vector $y_{[2]}$.

The second lattice point detection module 414 detects a lattice point u at which the value of a product of the submatrix that includes elements from the first row to the $i_0$-th row of the second sub-upper triangular matrix $uR[i_0]$ and the desired lattice point is the closest to the second sub-vector $y'_{[2]}$ in distance.

Figure 3:
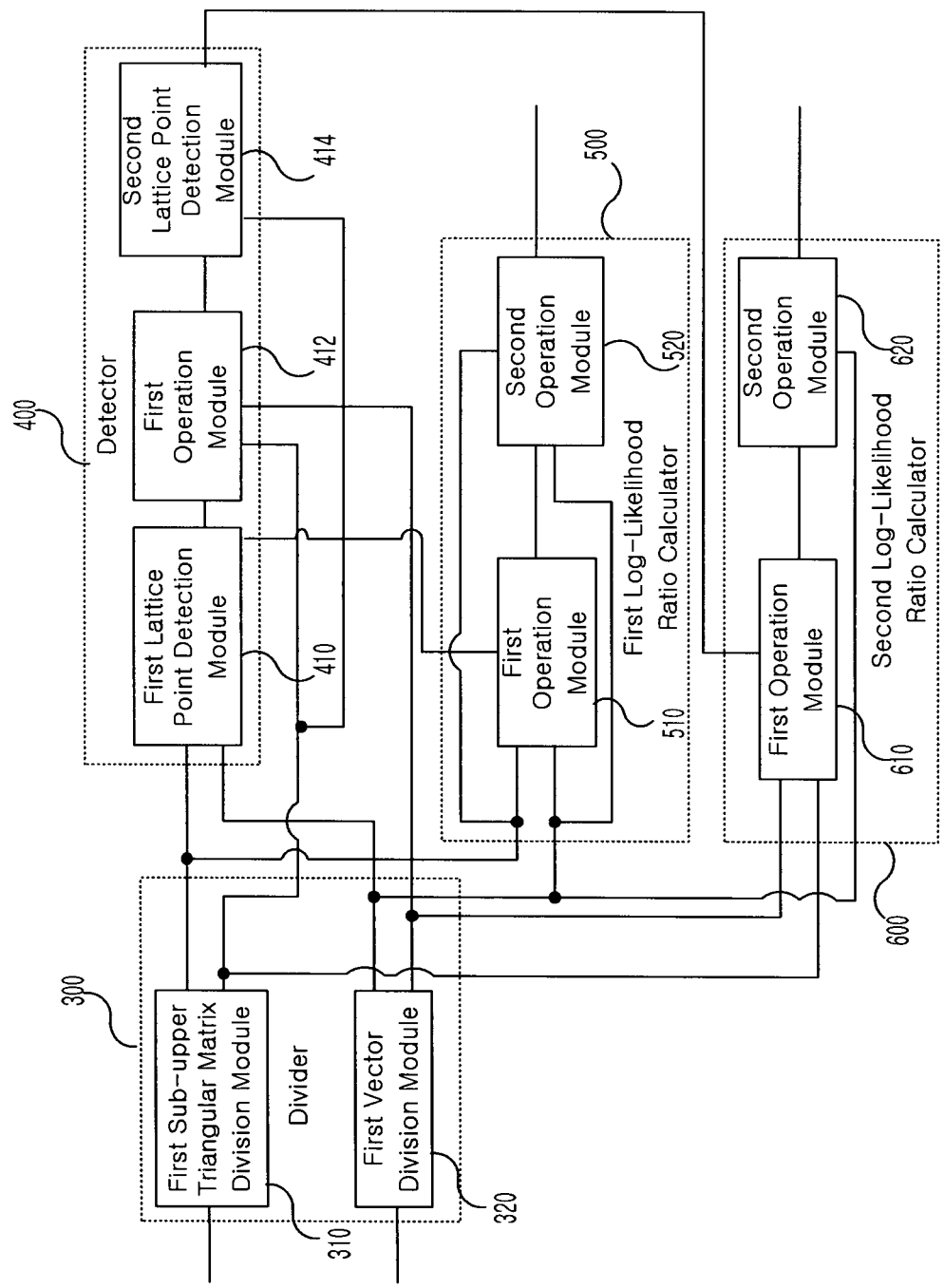
FIG. 3 is a block diagram illustrating a detailed structure of a transmission signal detection device according to a second exemplary embodiment of the present invention.

FIG. 3 is a block diagram illustrating a detailed structure of a log-likelihood ratio calculator to which the structure shown in FIG. 2 is applied according to a first exemplary embodiment of the present invention.

Referring to FIG. 3, the structure of the log-likelihood ratio calculator includes a first log-likelihood ratio calculator 500 and a second log-likelihood ratio calculator 600. Each log-likelihood ratio (LLR) corresponding to the transmission signal vector including elements from the $(i_0+1)$-th row to M-th row and the transmission signal vector including elements from the first row to the $i_0$-th row is calculated by a max-log map algorithm using the detected lattice point v and the lattice point u, respectively.

The first log-likelihood ratio calculator 500 calculates a log-likelihood ratio vector corresponding to the first sub-vector $y_{[1]}$ using the lattice point v and the max-log map algorithm. More particular, the first log-likelihood ratio calculator 500 includes the first operation module 510 and the second operation module 520.

The first operation module 510 calculates a lattice point $\bar{v}(i,k)$ that becomes the closest to the first sub-vector $y_{[1]}$ in distance when the first sub-upper triangular matrix $bR[i_0]$ is multiplied with a lattice point of an $M-i_0$-th degree having a value obtained by inverting a k-th bit value at a bit string corresponding to an i-th signal (where $1 \leq i \leq M-i_0$) of the lattice point v, as a bit value of a corresponding position.

The second operation module 520 obtains a log-likelihood ratio $LLR_{i+i_0,k}$ of the k-th bit of a bit string corresponding to an $i+i_0$-th signal of the transmission signal vector using a difference between a value of the product of the first sub-upper triangular matrix $bR[i_0]$ and the lattice point $\bar{v}(i,k)$ with respect to the first sub-vector $y_{[1]}$ in distance, and a value of product of the first sub-upper triangular matrix $bR[i_0]$ and the lattice point v with respect to the first sub-vector $y_{[1]}$ in distance.

The second log-likelihood ratio calculator 600 calculates a log-likelihood ratio vector corresponding to the second sub-vector $y_{[2]}$ using the lattice point u and the max-log map algorithm. More particularly, the second log-likelihood ratio calculator 600 includes a first operation module 610 and a second operation module 620.

The first operation module 610 calculates a lattice point $\bar{u}(i,k)$ that becomes the closest to the transformed second sub-vector $y'_{[2]}$ in distance when the second sub-upper triangular matrix $uR[i_0]$ is multiplied with a lattice point of a $i_0$-th degree having a value obtained by inverting a k-th bit value at a bit string corresponding to an i-th signal (where $1 \leq i \leq i_0$) of the lattice point u, as a bit value of a corresponding position.

The second operation module 620 obtains a log-likelihood ratio $LLR_{i,k}$ of the k-th bit of the bit string corresponding to an i-th signal of the transmission signal vector using a difference between a value of a product of the submatrix including elements from the first column to the $i_0$-th column of the second sub-upper triangular matrix $uR[i_0]$ and the lattice point $\bar{u}(i,k)$ with respect to the first sub-vector $y'_{[2]}$ in distance and a value of a product of the first sub-upper triangular matrix $uR[i_0]$ and the lattice point u with respect to the first sub-vector $y'_{[2]}$ in distance.

Figure 4:
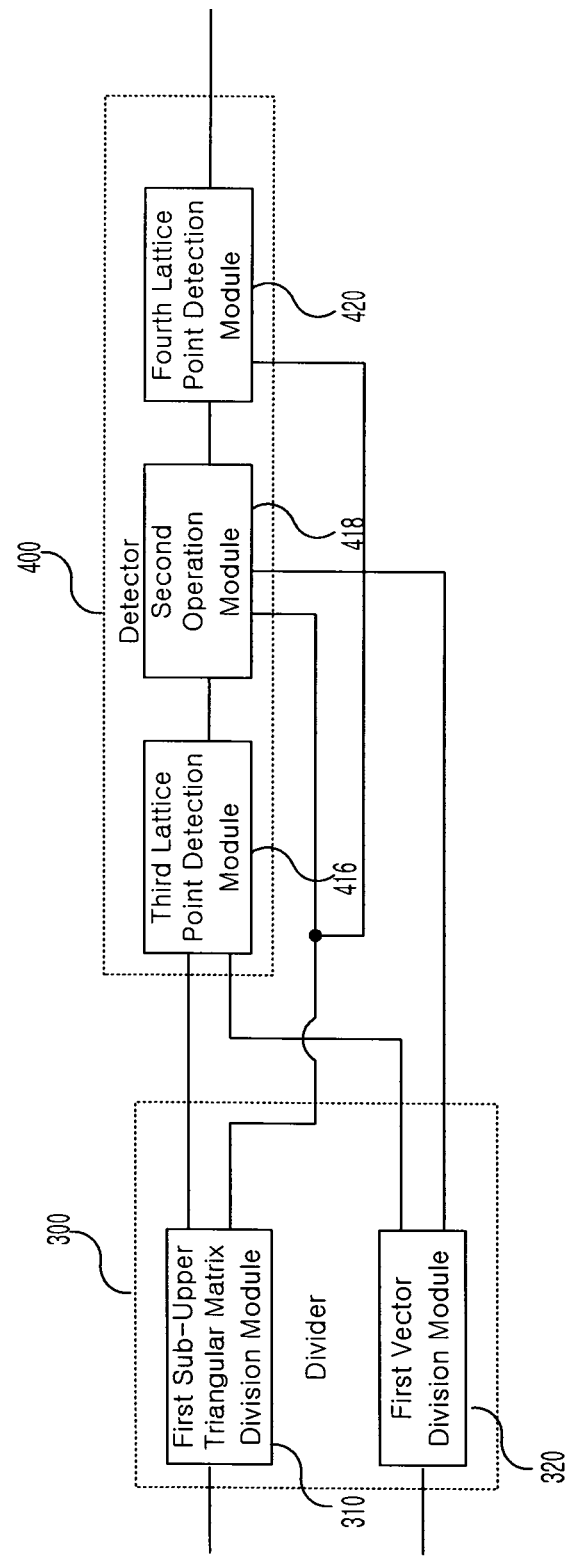
FIG. 4 is a block diagram illustrating a detailed structure of a transmission signal detection device according to a third exemplary embodiment of the present invention.

FIG. 4 is a block diagram illustrating a detailed structure of a divider and a detector according to the second exemplary embodiment of the present invention.

Referring to FIG. 4, since the structure of the divider 300 is the same as shown in FIGS. 2 and 3, the description thereof will be omitted.

The detector 400 includes a third lattice point detection module 416, a second operation module 418, and a fourth lattice point detection module 420.

The third lattice point detection module 416 detects m number of lattice points v[l] (where $1 \leq l \leq m$) in which a value of a product of the first sub-upper triangular matrix $bR[i_0]$ and the desired lattice points is less than a predetermined reference value with respect to the first sub-vector $y_{[1]}$ in distance.

The second operation module 418 calculates, with respect to each l, the transformed second sub-vector $y'_{[2]}[l]$ by eliminating the value of a product of the lattice point v[l] and the submatrix that includes elements from an $(i_0+1)$-th column to an M-th column of the second sub-upper triangular matrix $uR[i_0]$ from the second sub-vector $y_{[2]}$.

The fourth lattice point detection module 420 detects a plurality of lattice points u[l][h] in which the value of a product of the submatrix that includes elements from a first column to an $i_0$-th column of the second sub-upper triangular matrix $uR[i_0]$ and the lattice points with respect to the transformed second sub-upper triangular matrix $y'_{[2]}[l]$ in distance is less than the predetermined reference value.

Figure 5:
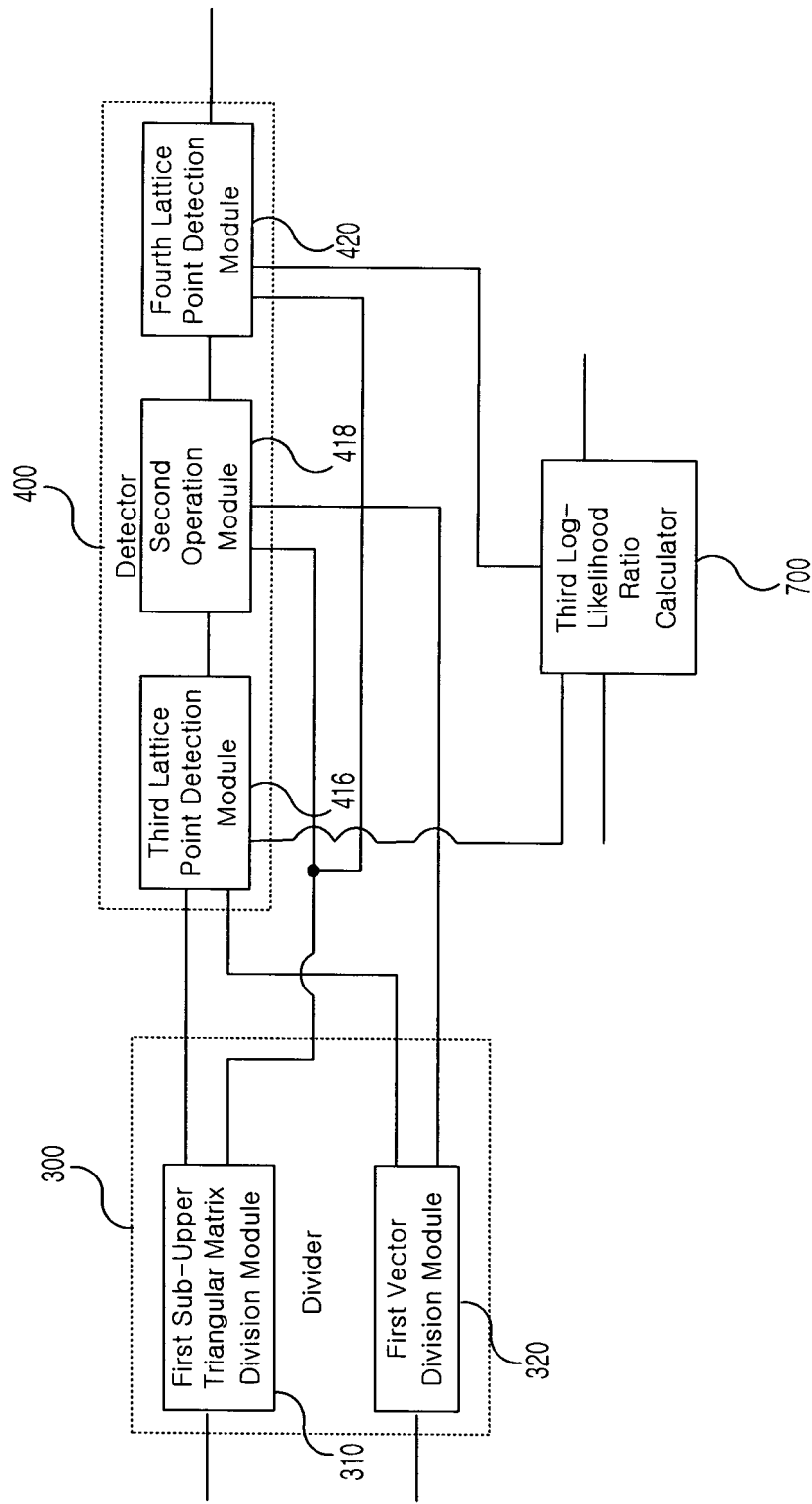
FIG. 5 is a block diagram illustrating a detailed structure of a transmission signal detection device according to a fourth exemplary embodiment of the present invention.

FIG. 5 is a block diagram illustrating a detailed structure of a log-likelihood ratio calculator to which the structure shown in FIG. 4 is applied according to the second exemplary embodiment of the present invention.

Referring to FIG. 5, a third log-likelihood ratio calculator 700 that calculates the log-likelihood ratio using the lattice points output from the detector 400 calculates the log-likelihood ratio $LLR_{i,k}$ of a k-th bit $x_{i,k}$ of the bit string corresponding to the i-th signal by using a sum $\bar{d}_i(u[l][h])+(v[l])$ of each corresponding distance calculated with respect to a plurality of lattice points $$\begin{bmatrix} u[l][h] \\ v[l] \end{bmatrix}$$

and the value $\alpha(i,k)$ to which a log is applied to the previous probability ratio.

Figure 6:
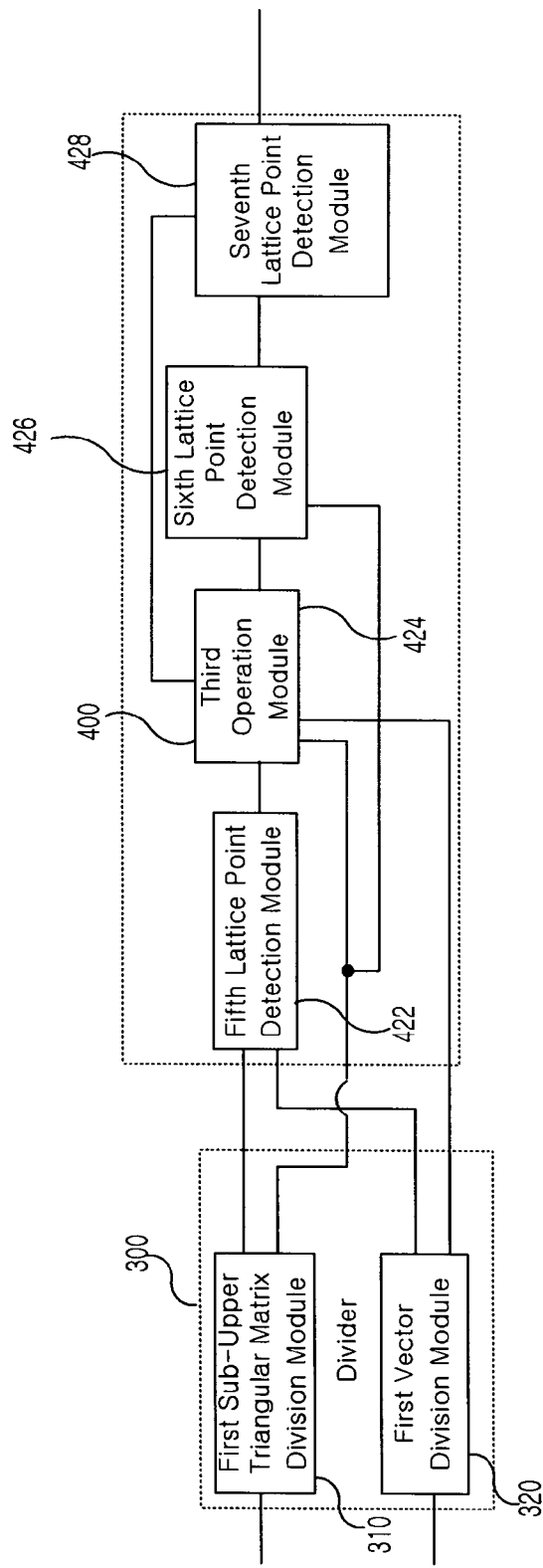
FIG. 6 is a block diagram illustrating a detailed structure of a transmission signal detection device according to a fifth exemplary embodiment of the present invention.

FIG. 6 is a block diagram illustrating a detailed structure of a divider and a detector according to the third exemplary embodiment of the present invention.

Referring to FIG. 6, the structured of the divider 300 is the same as the structure shown in FIGS. 2 to 5. Therefore, a detailed description thereof will be omitted.

The detector 400 includes a fifth lattice point detection module 422, a third operation module 424, a sixth lattice point detection module 426, and a seventh lattice point detection module 428.

The fifth lattice point detection module 422 detects m number of lattice points v[l] (where $1 \leq l \leq m$) in which the value of a product of the first sub-upper triangular matrix $bR[i_0]$ and the desired lattice points with respect to the first sub-vector $y_{[1]}$ in distance is less than a predetermined reference value.

The third operation module 424 calculates, with respect to each l (where $1 \leq l \leq m$), the transformed second sub-vector $y'_{[2]}[l]$ by eliminating the value of a product of the lattice point v[l] and the submatrix that includes elements from the $i_0+1$-th column to the M-th column of the second sub-upper triangular matrix $uR[i_0]$ from the second sub-vector $y_{[2]}$.

The sixth lattice point detection module 426 detects, with respect to each l where $1 \leq l \leq m$), a plurality of lattice points u[l] in which the value of a product of the submatrix that includes elements from the first column to the $i_0$-th column of the second sub-upper triangular matrix $uR[i_0]$ and the desired lattice points is the closest to the transformed second sub-upper triangular matrix $y'_{[2]}[l]$ in distance.

The seventh lattice point detection module 428 receives distance values d(v[l]) and $\bar{d}_i(u[l])$ corresponding to the detected plurality of lattice points v[l] and u[l] so as to select a lattice point $$\begin{bmatrix} u[l_0] \\ v[l_0] \end{bmatrix}$$

at which a value of $d(v[l])+\bar{d}_i(u[l])$ is minimized.

Figure 7:
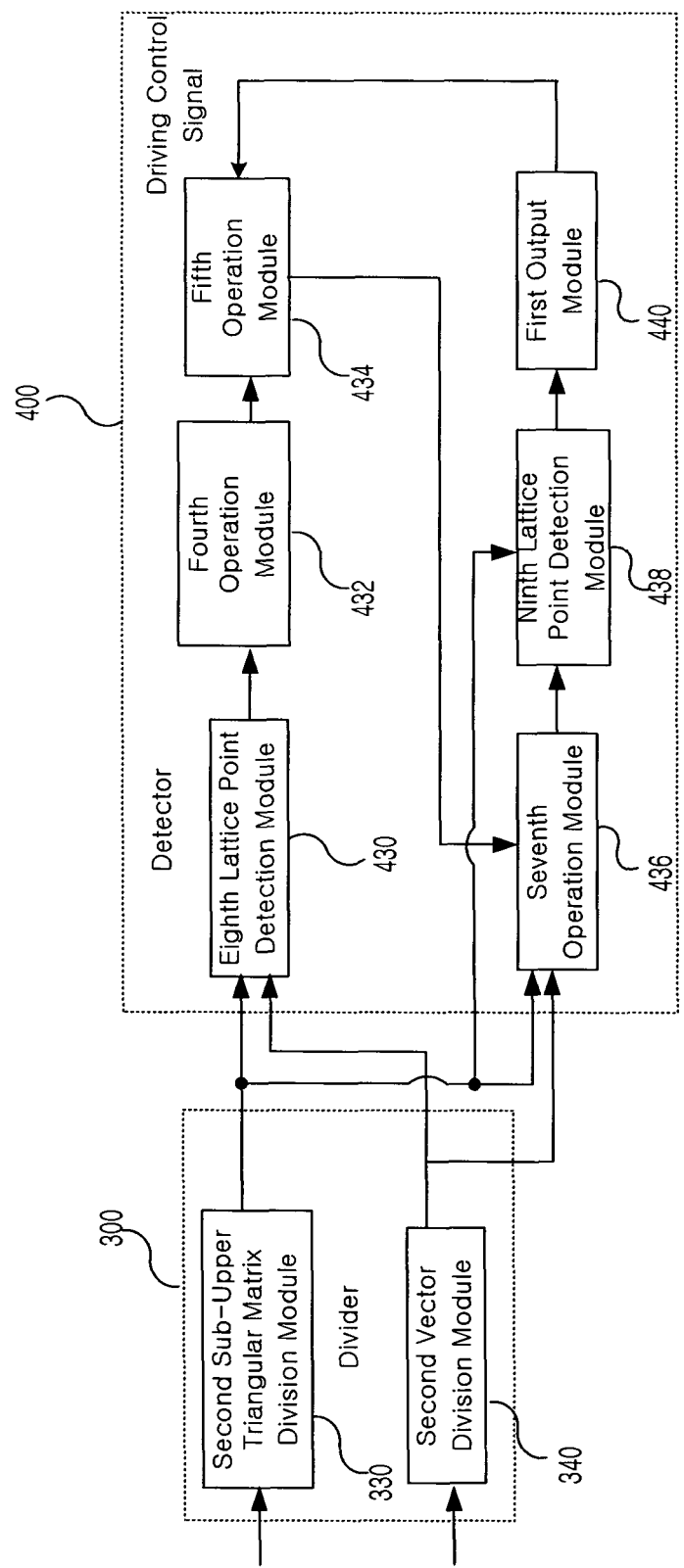
FIG. 7 is a block diagram illustrating a detailed structure of a transmission signal detection device according to a sixth exemplary embodiment of the present invention.

FIG. 7 is a block diagram illustrating a detailed structure of a divider and a detector according to a fourth exemplary embodiment of the present invention.

Referring to FIG. 7, the divider 300 includes a second sub-upper triangular matrix division module 330 and a second vector division module 340.

The second sub-upper triangular matrix division module 330 divides the upper triangular matrix R into a plurality of sub-upper triangular matrices R[k] (where $0 \leq k \leq a+1$) according to a plurality of specific rows determined by the SNR or the number of rows $(i_0, i_1, \ldots, i_a, 1 \leq i_0 < i_1 < \ldots < i_a < M$, where M is the entire number of rows of the upper triangular matrix R) as follows.

$$R[a+1]_{ij} := R_{(i_a+i)(i_a+j)}, \quad 1 \leq i, j \leq M - i_a$$

$$R[a]_{ij} := R_{(i_{a-1}+i)(i_{a-1}+j)}, \quad 1 \leq i \leq i_a - i_{a-1}, 1 \leq j \leq M - i_{a-1}$$

$$\vdots$$

$$R[k]_{ij} := R_{(i_{k-1}+i)(i_{k-1}+j)}, \quad 1 \leq i \leq i_k - i_{k-1}, 1 \leq j \leq M - i_{k-1}$$

$$\vdots$$

$$R[1]_{ij} := R_{(i_0+i)(i_0+j)}, \quad 1 \leq i \leq i_1 - i_0, 1 \leq j \leq M - i_0$$

$$R[0]_{ij} := R_{ij}, \quad 1 \leq i \leq i_0, 1 \leq j \leq M$$

The second vector division module 340 divides the vector y into a plurality of sub-vectors $y_{[k]}$ (where $0 \leq k \leq a+1$) so as to correspond to the plurality of sub-upper triangular matrices R[k] (where $0 \leq k \leq a+1$). An $(a+2)$-th sub-vector $y_{[0]}$ is a sub-vector that includes elements from a first row to an $i_0$-th row of the vector y and an $(a+2-k)$-th sub-vector $y_{[k]}$ is a sub-vector from an $i_{k-1}+1$-th row to an $i_k$-th row of the vector y (where $1 \leq k \leq a$). The first sub-vector $y_{[a+1]}$ divides the vector y into sub-vectors from the $i_a$-th row to the M-th row.

The detector 400 includes an eighth lattice point detection module 430, a fourth operation module 432, a fifth operation module 434, a sixth operation module 436, a ninth lattice point detection module 438, and a first output module 440.

The eighth lattice point detection module 430 calculates a lattice point v(a+1) in which a value of a product of the sub-upper triangular matrix R[a+1] and a desired lattice point is the closest in distance from a first sub-vector $y_{[a+1]}$.

The fourth operation module 432 sets $i_{-1}=0$ and substitutes a as an initial value of k.

The fifth operation module 434 calculates a column vector $$w = \begin{bmatrix} v(k+1) \\ \vdots \\ v(a+1) \end{bmatrix}$$

in which the obtained vectors with respect to the given k, that is, column of vectors, are sequentially arranged from v(k+1) to v(a+1).

The sixth operation module 436 calculates an (a+2-k)-th transformed sub-vector $y'_{[k]}$ by eliminating a value of a product of the column vector w and the submatrix that includes elements from an $(i_k-i_{l-1}+1)$-th column to an $(M-i_{k-1})$-th column of the sub-upper triangular matrix R[k] from the (a+2-k)-th sub-vector $y_{[k]}$.

The ninth lattice point detection module 438 calculates a lattice point v(k) that causes a value of a product of a desired lattice point and the submatrix that includes elements from a first column to an $(i_k-i_{k-1})$-th column of the sub-upper triangular matrix R[k] with respect to the (a+2-k)-th transformed sub-vector $y'_{[k]}$ to be the smallest in distance.

The first output module 440 substitutes k−1 to k. When k is equal to or larger than 0, in order to obtain a column vector $$w = \begin{bmatrix} v(k+1) \\ \vdots \\ v(a+1) \end{bmatrix}$$

in which the column vectors from a v(k+1)-th column to a v(a+1)-th column are sequentially arranged, the first output module 440 outputs a control signal to drive the fifth operation module 434. When k is −1, the first output module 440 outputs the lattice point $$\begin{bmatrix} v(0) \\ v(1) \\ \vdots \\ v(a+1) \end{bmatrix}.$$

That is, the first output module 440 outputs the control signal to drive the fifth operation module 434 until k becomes −1 so as to repeat the operations performed by the fifth operation module 434, the sixth operation module 436, and the ninth lattice point detection module 438.

Figure 8:
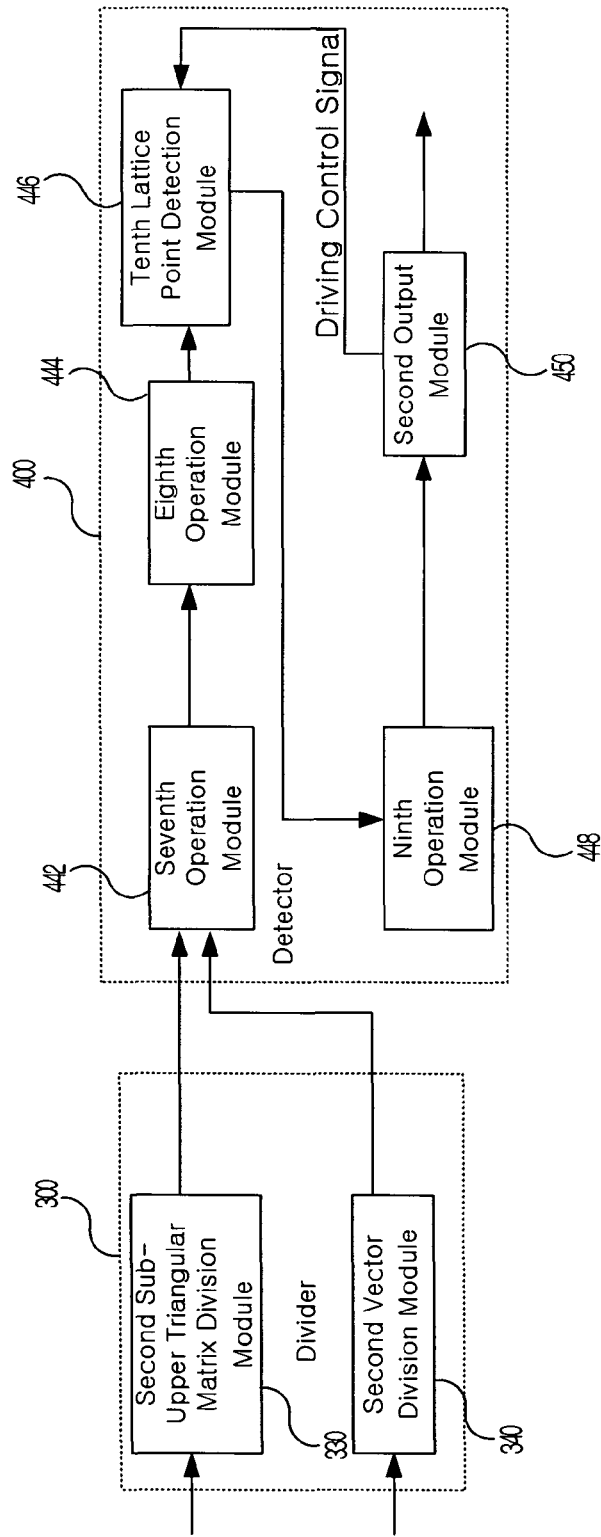
FIG. 8 is a block diagram illustrating a detailed structure of a transmission signal detection device according to a seventh exemplary embodiment of the present invention.

FIG. 8 is a block diagram illustrating a detailed structure of a divider and a detector according to a fifth exemplary embodiment of the present invention.

Referring to FIG. 8, since the structure of the divider 300 is the same as shown in FIG. 7, a detailed description thereof will be omitted.

The detector 400 includes a seventh operation module 442, an eighth operation module 444, a tenth lattice point detection module 446, and a second output module 450.

The seventh operation module 442 calculates a corresponding distance value d(v) and a number of $(n_{a+1})$ lattice points v, in which a value of a product of the sub-upper triangular matrix R[a+1] and the desired lattice point with respect to the first sub-vector $y_{[a+1]}$ in distance is less than a predetermined reference value. At this time, a set of $n_{a+1}$ number of lattice points v is defined as Σ.

The eighth operation module 444 sets $i_{-1}=0$, and substitute a to k as an initial value of k.

The tenth lattice point detection module 446 detects a plurality of lattice points u with respect to each lattice point v included in the set Σ. At this time, the sum $\underline{d}(u)$ of the value of a product of the submatrix that includes elements from an $\{(i_k-i_{k-1})+1\}$-th column to an $(M-i_{k-1})$-th column of the sub-upper triangular matrix R[k] and the lattice point v and the value of a product of the submatrix that includes elements from a first column to an $(i_k-i_{k-1})$-th column of the sub-upper triangular matrix R[k] and the lattice point u with respect to the (a+2-k)th sub-vector $y_{[k]}$ in distance should be less than a predetermined reference value. At the same time, the tenth lattice point detection module 446 detects $n_k$ number of lattice points $$\begin{bmatrix} u \\ v \end{bmatrix}$$

in which a sum of a value of distance d(v) and a value of distance $\underline{d}(u)$ is less than the predetermined reference value.

A ninth operation module 448 designates a sum of the distance d(v) and the distance $\underline{d}(u)$ to $$d\left(\begin{bmatrix} u \\ v \end{bmatrix}\right)$$

and the set of $n_k$ number of lattice points $$\begin{bmatrix} u \\ v \end{bmatrix}$$

as a symbol of the set 'Σ'.

The second output module 450 substitutes k−1 to k. When k is equal to or larger than 0, the second output module 450 outputs a control signal to control to drive the tenth lattice point detection module 446 in order to obtain a new Σ with respect to the changed k using a previous Σ. When k is −1, the second output module 450 outputs Σ which is the set of the stored lattice points.

Even though it is not shown in the drawings, a transmission signal detection device according to another exemplary embodiment of the present invention has substantially the same structure as the structure shown in FIG. 1 and is implemented by applying a plurality of received signals and a matrix that indicates channel states estimated with respect to each of a plurality of received signals Y. The transmission signal detection device according to this exemplary embodiment of the present invention includes a QR decomposer, a vector calculator, a divider, and a detector. In this case, the transmission signal detection device according to this exemplary embodiment of the present invention is applied to a multi-step decoder as an example. At this time, repeated descriptions will be omitted for each structure and only the related structures will be described as follows.

The divider may include a first sub-upper triangular matrix division module and a first sub-vector division module.

The first sub-upper triangular matrix division module divides a plurality of upper triangular matrices $R_{\{l\}}$ (where $1 \leq l \leq L$) into a first sub-upper triangular matrix $bR_{\{l\}}[i_0]$ (where $1 \leq l \leq L$) which is an $(M-i_0) \times (M-i_0)$ matrix and a second sub-upper triangular matrix $uR_{\{l\}}[i_0]$ (where $1 \leq l \leq L$) which is an $(i_0 \times M)$ matrix based on a predetermined row $i_0$ determined on the basis of the SNR or the number of rows.

The second sub-vector division module divides each of a plurality of vectors $y^{\{l\}}$ (where $1 \leq l \leq L$) into a first sub-vector $y_{[1]}^{\{l\}}$ and a second sub-vector $y_{[2]}^{\{l\}}$ so as to correspond to each of the divided first sub-upper triangular matrix $bR_{\{l\}}[i_0]$ and the second sub-upper triangular matrix $uR_{\{l\}}[i_0]$.

At this time, the detector may include a first lattice point detection module, a first operation module, and a second lattice point detection module.

The first lattice point detection module detects a lattice point v in which a value of a product of the first sub-upper triangular matrix $bR_{\{l\}}[i_0]$ and the lattice point with respect to the first sub-vector $y_{[1]}^{\{l\}}$ in distance is the closest for l (where $1 \leq l \leq L$).

The first operation module obtains the transformed second sub-vector $y'_{[2]}^{\{l\}}$ by eliminating the value of a product of the lattice point v and the submatrix that includes elements from an $(i_0+1)$-th column to the M-th column of the second sub-upper triangular matrix $uR_{\{l\}}[i_0]$ from the second sub-vector $y_{[2]}^{\{l\}}$ (where $1 \leq l \leq L$).

The second lattice point detection module detects a lattice point u in which the value of product of the lattice point and the submatrix that includes elements from a first column to the $i_0$-th column of the second sub-upper triangular matrix $uR_{\{l\}}[i_0]$ (where $1 \leq l \leq L$) in distance is the closest from the second sub-vector $y'_{[2]}^{\{l\}}$.

At this time, the first log-likelihood ratio calculator calculates the log-likelihood ratio $LLR_{i+i_0,k}^{\{l\}}$ of a k-th bit of an $(i+i_0)$-th bit string of the signal transmission vector corresponding to each of the vectors $y^{\{l\}}$ (where $1 \leq l \leq L$) and the log-likelihood ratio $LLR_{i,k}^{\{l\}}$ of a k-th bit of the bit string corresponding to an i-th signal using each of the first sub-upper triangular matrix $bR_{\{l\}}[i_0]$ (where $1 \leq l \leq L$) and the second sub-upper triangular matrix $uR_{\{l\}}[i_0]$ (where $1 \leq l \leq L$). More specifically, a first operation module, a third lattice point detection module, and a second operation module may be provided.

The first operation module may repeat calculation of the log-likelihood ratio $LLR_{i+i_0,k}^{\{l\}}$ of a k-th bit of an $(i+i_0)$-th bit string of the signal transmission vector corresponding to each of the vectors $y^{\{l\}}$ (where $1 \leq l \leq L$) using the first sub-upper triangular matrix $bR_{\{l\}}[i_0]$.

The third lattice point detection module decodes a log-likelihood ratio vector $LLR_{i+i_0,k}^{\{l\}}$ (where $1 \leq l \leq L$) so as to detect the lattice point $v^{\{l\}} = [v_1^{\{l\}} \ldots v_{M-i_0}^{\{l\}}]$.

The second operation module calculates the log-likelihood ratio $LLR_{i,k}^{\{l\}}$ of the k-th bit of the bit string corresponding to the i-th signal of the signal transmission vector corresponding to each of the vectors $y^{\{l\}}$ (where $1 \leq l \leq L$) using the lattice point $v^{\{l\}} = [v_1^{\{l\}} \ldots v_{M-i_0}^{\{l\}}]$ and the second sub-upper triangular matrix $uR_{\{l\}}[i_0]$.

On the other hand, the divider divides the upper triangular matrix R into a plurality of submatrices. The divider includes a second sub-upper triangular matrix division module and a second sub-vector division module.

The second sub-upper triangular matrix division module divides a plurality of upper triangular matrices $R_{\{l\}}$ (where $1 \leq l \leq L$) into a plurality of sub-upper triangular matrices $R_{\{l\}}[k]$ (where k is a, ..., 1, 0) by applying predetermined rows $(i_0, i_1, \ldots, i_a, 1 \leq i_0 < i_1 < \ldots < i_a < M)$ determined on the basis of the SNR or the number of rows.

The second sub-vector division module divides the vector $y^{\{l\}}$ into a plurality of sub-vectors $y^{\{l\}}[k]$ (where k is a, ..., 1, 0) so as to be corresponded to the plurality of sub-upper triangular matrices $R_{\{l\}}[k]$ (where k is a, ..., 1, 0).

At this time, the detector may include a first operation module and a first detection module. First, the first operation module calculates a transformed sub-vector $y'^{\{l\}}[k]$ which is transformed by eliminating a detected signal vector corresponding to a not-decreased k among a plurality of sub-vectors $y^{\{l\}}[k]$ (where k is a, ..., 1, 0), that is, k decreases one by one from a+1 to reach 0.

Hereinafter, a method of detecting a signal to which the above-described division detection method is applied will be described on the basis of the structure of the transmission signal detection device.

Figure 9:
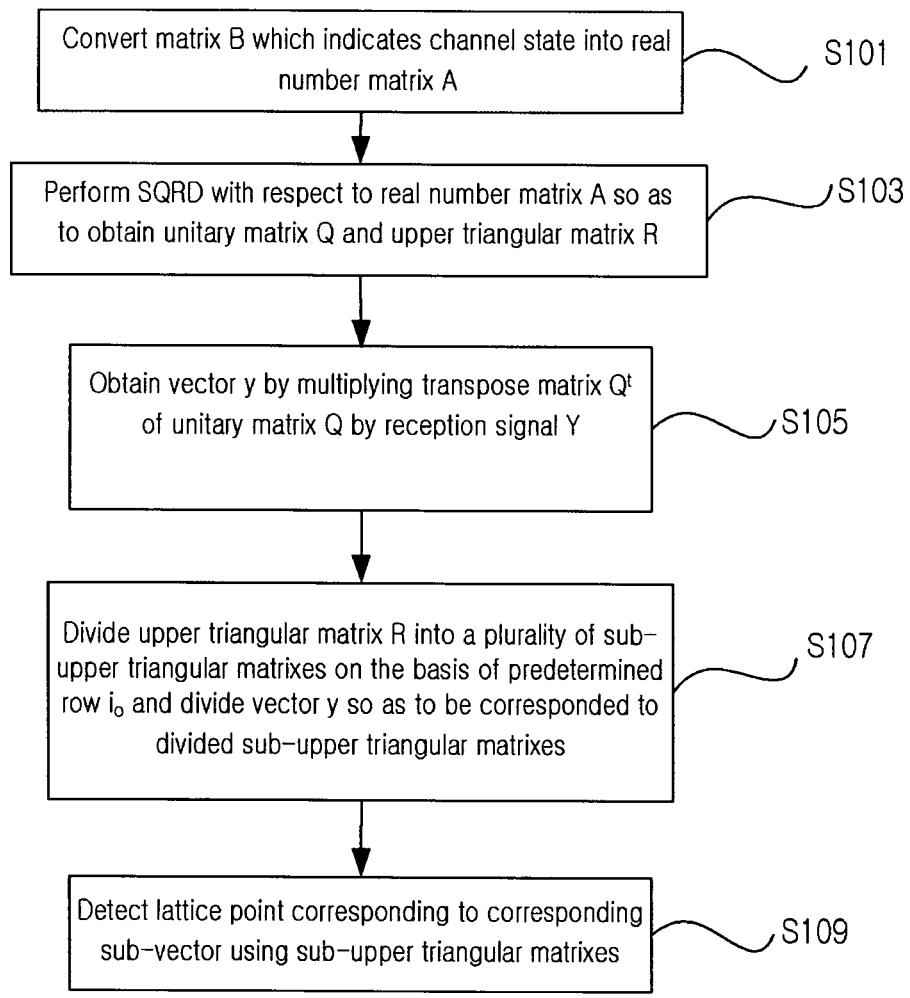
FIG. 9 is a flowchart illustrating a method of detecting a transmission signal, to which a division detection method is adopted, according to the first exemplary embodiment of the present invention.

FIG. 9 is a flowchart illustrating a method of detecting a transmission signal, to which a division detection method according to the exemplary embodiment of the present invention is adopted.

Referring to FIG. 9, in the method of detecting a transmission signal, the matrix B indicating the channel state is converted into a real number matrix A (step S101). If the matrix B includes real number elements, matrix A is set to be equal to the matrix B. Otherwise, the matrix A is set as $$A = \begin{bmatrix} \text{Re}\{B\} & -\text{Im}\{B\} \\ \text{Im}\{B\} & \text{Re}\{B\} \end{bmatrix}.$$

Here, the number of columns in the matrix A is set to M. When each signal of the transmission signal vector is divided into a real part and an imaginary part, the number of bits included in the bit string corresponding to the real part (or the imaginary part) in the signal constellation is set to Q.

The SQRD algorithm is applied to the real number matrix A converted in step S101 so as to obtain the unitary matrix Q and upper triangular matrix R (step S103).

Here, when the SQRD algorithm is performed for the matrix A, A is set to be equal to QR. When the SQRD algorithm is performed for $$\begin{bmatrix} A \\ \sigma I_M \end{bmatrix}, \begin{bmatrix} A \\ \sigma I_M \end{bmatrix}$$

is set to be equal to QR. Here, $\sigma$ indicates the reciprocal of the square root of a signal-to-noise ratio and $I_M$ indicates an M by M identity matrix. Q indicates a unitary matrix and R indicates an upper triangular matrix. At this time, the amount of calculation thereafter may be reduced by using $$\begin{bmatrix} A \\ \sigma I_M \end{bmatrix}.$$

At this time, the transmission signal corresponding to the column number of the matrix in which the SQRD algorithm is not performed and the transmission signal corresponding to a column number of R are different from each other. Therefore, in the transmission signal, the sorted order should be stored.

The SQRD algorithm may be used with a PSA (past-sorting algorithm). The larger the column number, the larger the SNR in the R corresponding to the number.

In the SQRD algorithm, the sorting and the QR-decomposition are simultaneously performed. Instead of the SQRD algorithm, each of the columns included in the matrix A are sequentially arranged in the order of the Euclidean norm of each column vector. Further, the unitary matrix and the upper triangular matrix obtained by QR decomposition with respect to the arranged matrix may be set to Q and R, respectively.

Here, the QR decomposition may be implemented by following three exemplary embodiments.

According to the first exemplary embodiment, the sorted QR decomposition (SQRD) is applied on $$\begin{bmatrix} A \\ \sigma I_M \end{bmatrix}$$

where $\sigma$ is the reciprocal of the square root of a signal-to-noise ratio measured in the receiving terminal and $I_M$ is the identity matrix with the size of the signal vector to be detected.

According to the second exemplary embodiment, the QR decomposition is applied on the matrix A after the columns of the matrix A are rearranged in increasing order of the Euclidean norm of each column vector.

According to the third exemplary embodiment, the columns of the matrix A, representing the channel state, are rearranged in increasing order of the Euclidean norm of each column vector and then QR decomposition is applied on $$\begin{bmatrix} A \\ \sigma I_M \end{bmatrix}$$

where $\sigma$ is the reciprocal of the square root of a signal-to-noise ratio measured in the receiving terminal and $I_M$ is the identity matrix with the size of the signal vector to be detected.

Next, the vector y is obtained by multiplying a transpose matrix $Q^t$ of the unitary matrix Q by the received signal Y (step S105).

Equation 2 will show y that satisfies following equation, that is, $$y = Q^t \begin{bmatrix} \text{Re}\{Y\} \\ \text{Im}\{Y\} \end{bmatrix}.$$

At this time, $\eta$ and $$\begin{bmatrix} \text{Re}\{Z\} \\ \text{Im}\{Z\} \end{bmatrix}$$

have the same probability distribution and Equation 2 is equivalent to Equation 1.

Hereinafter, it is represented as $y=[y_1\ y_2\ \ldots\ y_M]^t$, $$x = \begin{bmatrix} \text{Re}\{X\} \\ \text{Im}\{X\} \end{bmatrix} = [x_1\ x_2\ \ldots\ x_M]^t,$$

and $\eta=[\eta_1\ \eta_2\ \ldots\ \eta_M]^t$.

Next, the upper triangular matrix R is divided into a plurality of sub-upper triangular matrices on the basis of a predetermined row $i_0$ determined on the basis of the SNR or the number of rows, and then the vector y is divided so as to correspond to the divided sub-upper triangular matrices (step S107).

Next, the lattice point corresponding to the corresponding sub-vector is detected using the divided plurality of sub-upper triangular matrices (step S109).

Figure 10:
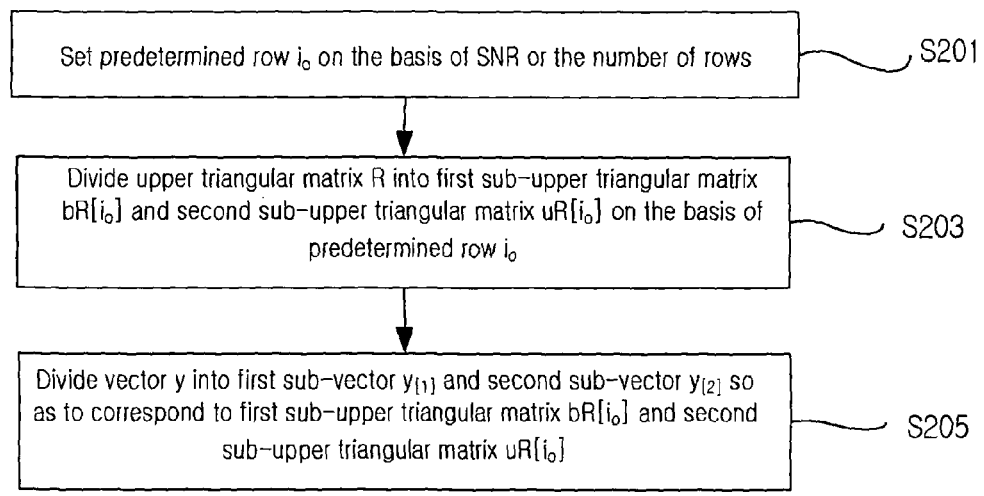
FIG. 10 is a flowchart illustrating a first example of step S107 shown in FIG. 9 in detail.

FIG. 10 is a flowchart illustrating a first example of step S107 shown in FIG. 9, in detail.

Referring to FIG. 10, first, the predetermined row $i_0$ is determined on the basis of the SNR or the number of rows (step S201).

Next, the upper triangular matrix is divided into the first sub-upper triangular matrix $bR[i_0]$ which is the $(M-i_0) \times (M-i_0)$ matrix and the second sub-upper triangular matrix $uR[i_0]$ which is the $(i_0 \times M)$ matrix on the basis of the predetermined row $i_0$ (step S203).

At this time, the first sub-upper triangular matrix $bR[i_0]$ is the $(M-i_0) \times (M-i_0)$ matrix having column vectors equal to or larger than the $(i_0+1)$-th column among the matrix having row vectors from the $(i_0+1)$-th row in which one is increased from the predetermined row $i_0$ to the last M-th row of the upper triangular matrix R. The second sub-upper triangular matrix $uR[i_0]$ is the $(i_0 \times M)$ matrix having the row vectors from the first row to the ( )-th row of the upper triangular matrix R.

At this time, the first sub-upper triangular matrix and the second sub-upper triangular matrix may be represented by Equation 3.

$$bR[i_0]_{ij} := R_{(i_0+i)(i_0+j)}, 1 \le i,j \le M-i_0$$

$$uR[i_0]_{ij} := R_{ij}, 1 \le i \le i_0, 1 \le j \le M \quad \text{[Equation 3]}$$

Next, the vector y is divided into the first sub-vector $y_{[1]}$ and the second sub-vector $y_{[2]}$ so as to correspond to the first sub-upper triangular matrix $bR[i_0]$ and the second sub-upper triangular matrix $uR[i_0]$ (step S205).

Figure 11:
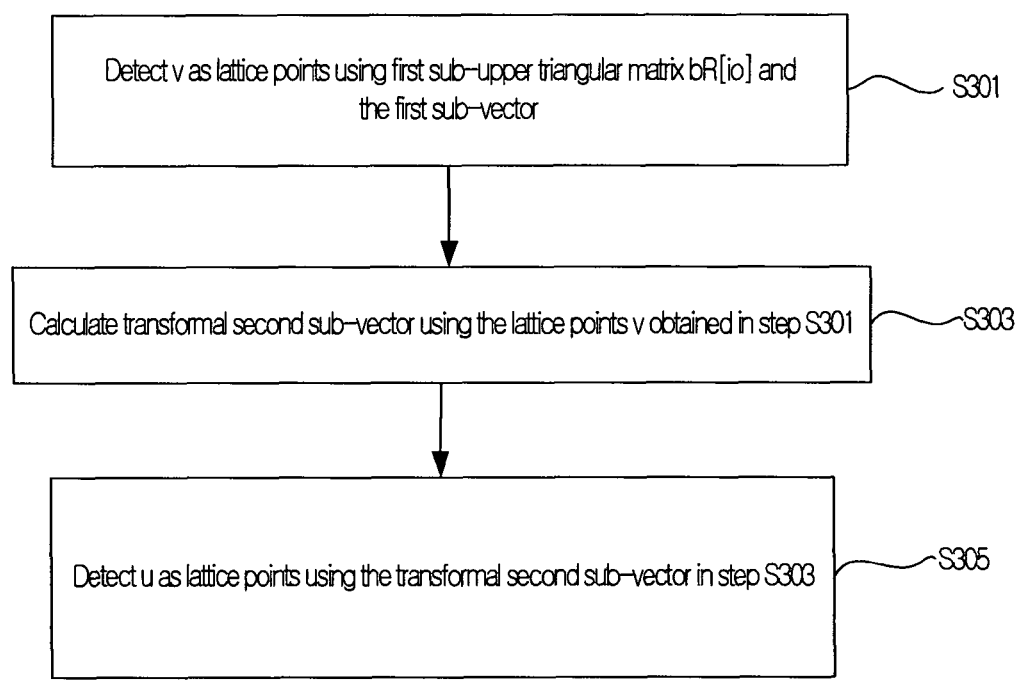
FIG. 11 is a flowchart illustrating an example of step S109 shown in FIG. 9 to which S107 shown in FIG. 10 is applied.

FIG. 11 is a flowchart illustrating a first example of step S109 shown in FIG. 9, in detail, and FIG. 11 is a flowchart illustrating a method of detecting the lattice point by applying step S107 shown in FIGS. 9 and 10.

Referring to FIG. 11, the lattice point may be detected by using the following Equation 4.

[Equation 4]

$$[y_{i_0+1} \ldots y_M]^t = bR[i_0][x_{i_0+1} \ldots x_M]^t + [\eta_{i_0+1} \ldots \eta_M]^t \quad (1)$$

$$[y_1 \ldots y_{i_0}]^t = uR[i_0]x + [\eta_1 \ldots \eta_{i_0}]^t \quad (2)$$

Here, $[y_{i_0+1} \ldots y_M]^t$ of (1) indicates the first sub-vector $y_{[1]}$ and $[y_1 \ldots y_{i_0}]^t$ corresponds to the second sub-vector $y_{[2]}$.

The lattice point v in which the value of product of the first sub-upper triangular matrix $bR[i_0]$ and the desired lattice point v is the closest to the first sub-vector $y_{[1]}$ in distance is then detected (step S301).

That is, $[x_{i_0+1} \ldots x_M]^t$ is obtained by (1) of Equation 4. At this time, $\eta_{i_0+1}, \ldots, \eta_M$ indicates Gaussian noises independent from each other. Further, $[x_{i_0+1} \ldots x_M]^t$ exist in an $(M-i_0)$ dimensional space $D_1$ in which each coordinate is one of $2^Q$ number of integral numbers.

Among the lattice points included in the space $D_1$, a point having the smallest value is obtained by using following Equation 5.

$$\|[y_{i_0+1} \ldots y_M]^t - bR[i_0][x_{i_0+1} \ldots x_M]^t\|^2 \quad \text{[Equation 5]}$$

The lattice point obtained by operating Equation 5 is represented as $v = [v_1 \ldots v_{M-i_0}]^t$.

Next, the transformed second sub-vector $y'_{[2]}$ is obtained by eliminating the value of a product of the lattice point v and the submatrix that includes elements from the $(i_0+1)$-th column to the M-th column of the second sub-upper triangular matrix $uR[i_0]$ from the second sub-vector $y_{[2]}$ (step S303).

That is, in (2) of Equation 4, v is substituted to $[x_{i_0+1} \ldots x_M]$, that is, $x_{i_0+i} = v_i$ (where $1 \leq i \leq M-i_0$) is set. And then, $$y'_j = y_j - \sum_{1 \leq i \leq M-i_0} uR[i_0]_{j(i_0+i)} v_i$$

for every j (where $1 \leq j \leq i_0$) is calculated. (Here, $[y'_1 \ldots y'_{i_0}]^t$ is referred to as the transformed second sub-vector $y'_{[2]}$.)

Next, the lattice point u in which the value of a product of the lattice point u and the submatrix that includes elements from the first column to the $i_0$-th column of the second sub-upper triangular matrix $uR[i_0]$ is the closest to the transformed second sub-vector $y'_{[2]}$ in distance is detected (step S305).

That is, the following Equation 6 is used.

$$[y_1^t \ldots y_{i_0}^t]^t = uR[i_0](1:i_0)[x_1 \ldots x_{i_0}]^t + [\eta_1 \ldots \eta_{i_0}]^t \quad \text{[Equation 6]}$$

Here, $uR[i_0](1:i_0)$ indicates the submatrix that includes elements from the first column to the $i_0$-th column.

At this time, $[x_1 \ldots x_{i_0}]^t$ exists in an $i_0$-dimensional space $D_2$ at which the coordinate is one of $2^Q$ number of integral numbers.

Among the lattice points included in the space $D_2$, $[x_1 \ldots x_{i_0}]$ causing the result of Equation 7 to be the smallest value is obtained by using Equation 6.

$$\|[y_1^t \ldots y_{i_0}^t]^t - uR[i_0](1:i_0)[x_1 \ldots x_{i_0}]^t\|^2 \quad \text{[Equation 7]}$$

$[x_1 \ldots x_{i_0}]$ obtained by operating Equation 7 is output as the lattice point $u = [u_1 \ldots u_{i_0}]^t$.

Finally, $$\hat{x} = \begin{bmatrix} u \\ v \end{bmatrix}$$

is output as the transmission signal vector.

At this time, each of coordinates included in lattice points u and v should correspond to the signal constellation mapping on signal transmission and the result of the conversion equation thereof. In order to obtain the lattice points u and v, a plurality of algorithms, such as a sphere decoding algorithm, a near ML technology such as the QRM-MLD, and a sequential interference elimination algorithm may be selected.

In order to check the decrement of the amount of calculation, it is assumed that a full search is performed in the spaces $D_1$ and $D_2$ when detecting the lattice points v and u. In order to obtain $\hat{X}$, the distance of $2^{Q(M-i_0)} + 2^{Qi_0}$ number of points are calculated. As the degree of the lattice points v and u is reduced, the amount of calculation necessary to calculate the distance is reduced.

Figure 12:
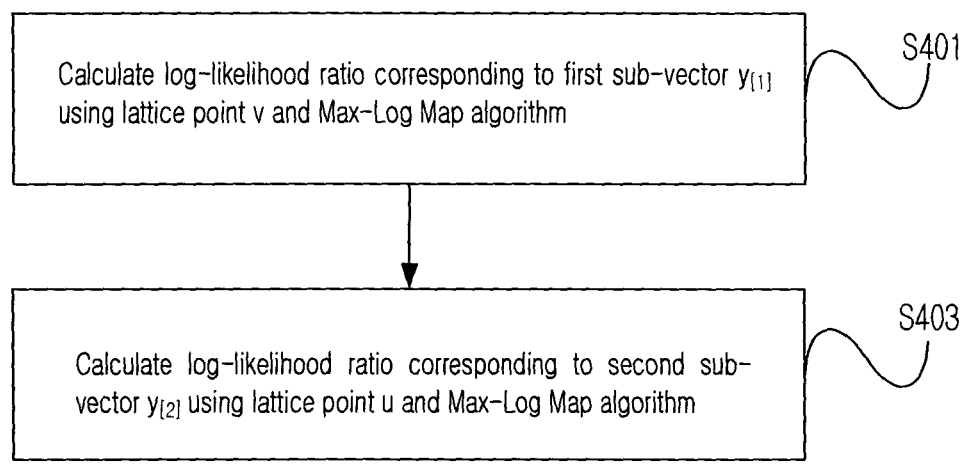
FIG. 12 is a flowchart illustrating a method of calculating a log-likelihood ratio by applying the flowcharts shown in FIGS. 10 and 11.

FIG. 12 is a flowchart illustrating a method of calculating the log-likelihood ratio by applying the flowchart shown in FIG. 10 and FIG. 11.

Referring to FIG. 12, the log-likelihood ratio is calculated by the following method. First, the log-likelihood ratio LLR corresponding to the first sub-vector $y_{[1]}$ is obtained using the max-log map algorithm and the lattice point v obtained in FIG. 11 (step S401). Second, the log-likelihood ratio (LLR) corresponding to the second sub-vector $y_{[2]}$ is obtained using the lattice point u and the max-log map algorithm obtained (step S403).

Specifically, in step S401, the log-likelihood ratio $LLR_{i+i_0,k}$ vector corresponding to $([x_{i_0+1} \ldots x_M]^t)$ is obtained by using the max-log map algorithm in (1) of Equation 4 with respect to $[x_{i_0+1} \ldots x_M]^t$.

Further, in step S403, the log-likelihood ratio $LLR_{i,k}$ vector corresponding to $[x_1 \ldots x_{i_0}]^t$ is calculated by substituting the lattice point v to $[x_{i_0+1} \ldots x_M]$ in (2) of Equation 4, that is, setting $x_{i_0+i} = v_i$ (where $1 \leq i \leq M-i_0$) and calculating $$y'_j = y_j - \sum_{1 \leq i \leq M-i_0} uR[i_0]_{j(i_0+i)} v_i$$

for every j (where $1 \leq j \leq i_0$).

Figure 13:
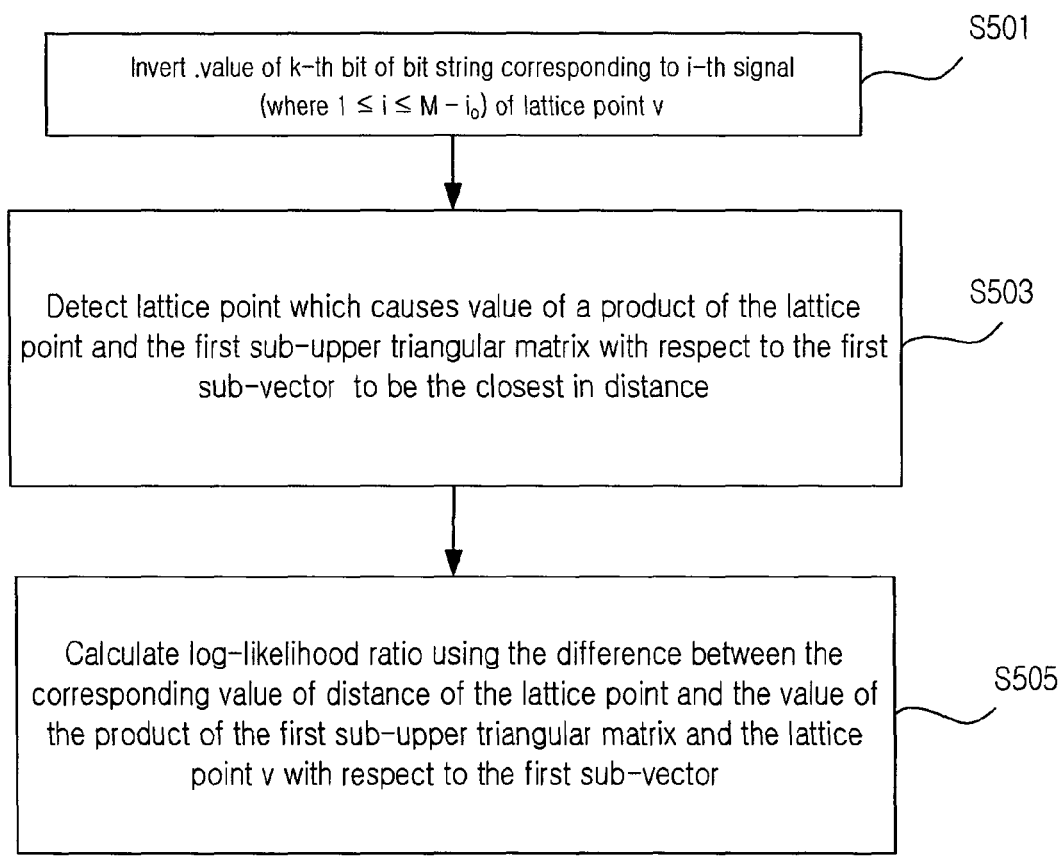
FIGS. 13 and 14 are flowcharts illustrating steps S401 and S403 shown in FIG. 12 in detail.
Figure 14:
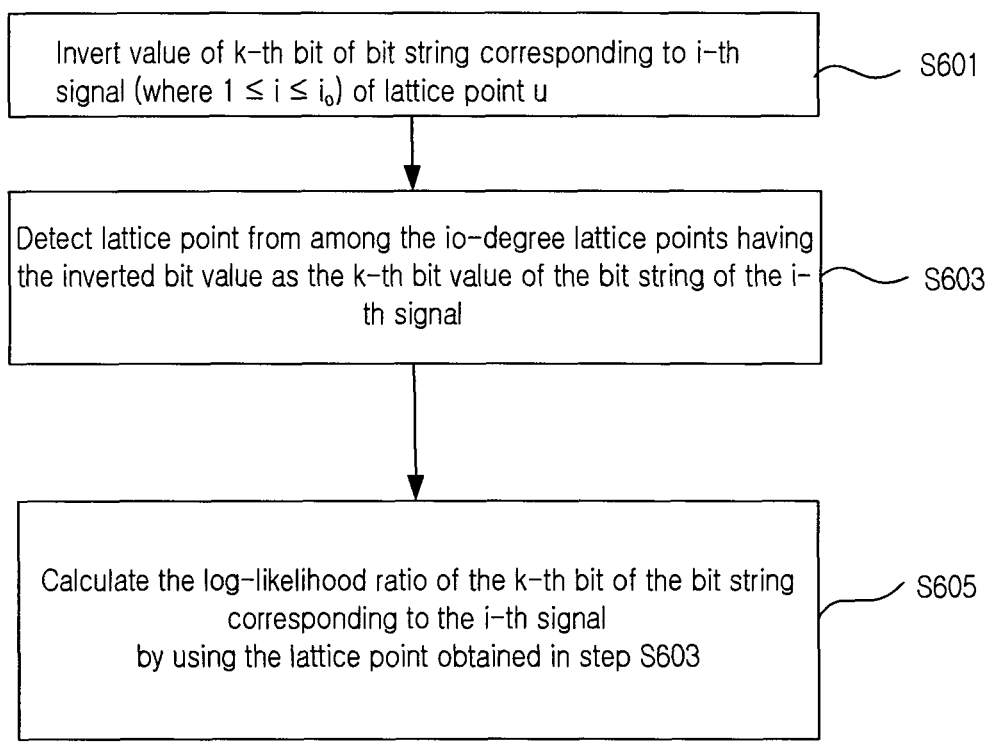

FIGS. 13 and 14 are flowcharts illustrating steps S401 and S403 shown in FIG. 12 in detail.

FIG. 13 shows step S401 in detail. Referring to FIG. 13, a value of the k-th bit of the bit string corresponding to the i-th signal (where $1 \leq i \leq M-i_0$) of the lattice point v is inverted (step S501). That is, if the value of the bit of the corresponding position is 0, it is changed to 1, and if the value of the bit of the corresponding position is 1, it is changed to 0.

In step S401, the lattice point $\bar{v}(i,k)$ in which the value of a product of the lattice point and the first sub-upper triangular matrix $bR[i_0]$ with respect to the first sub-vector $y_{[1]}$ is the closest in distance is obtained among the $(M-i_0)$-degree lattice points having the inverted bit value as the bit value of the k-th bit of the bit string corresponding to the i-th signal (step S503).

Next, the log-likelihood ratio $(LLR_{i+i_0,k})$ of the k-th bit of the bit string corresponding to the $(i+i_0)$-th signal of the signal transmission vector corresponding to the vector y is obtained by using the difference between the corresponding value of distance of the lattice point $\bar{v}(i,k)$ obtained in step S503 and the value of the product of the first sub-upper triangular matrix $bR[i_0]$ and the lattice point v with respect to the first sub-vector $y_{[1]}$ (step S505).

That is, the value of LLR of the k-th bit of the bit string corresponding to the $(i+i_0)$-th signal of the signal transmission vector may be represented by $(LLR_{i+i_0,k})$ as in the following Equation 8.

$$LLR_{i+i_0,k} = (-1)^{v_{i,k}} \frac{\|[y_{i_0+1} \ldots y_M]^t - bR[i_0]\bar{v}(i,k)\|^2 - \|[y_{i_0+1} \ldots y_M]^t - bR[i_0]v\|^2}{2\sigma^2} \quad \text{[Equation 8]}$$

FIG. 14 shows step S403. Referring to FIG. 14, a value of the k-th bit of the bit string corresponding to the i-th signal (where $1 \leq i \leq i_0$) of the lattice point u is inverted with respect to the k-th bit of the bit string of the i-th signal of the transmission vector (step S601).

Next, among the $i_0$-degree lattice points having the inverted bit value as the k-th bit value of the bit string of the i-th signal, the lattice point $\bar{u}(i,k)$ in which the value of a product of the lattice point and the submatrix that includes elements from the first column to the $i_0$-th column of the second sub-upper triangular matrix $uR[i_0]$ is the closest to the transformed second sub-vector $y'_{[2]}$ in distance is obtained (step S603).

Next, the log-likelihood ratio $LLR_{i,k}$ of the k-th bit of the bit string corresponding to the i-th signal of the signal transmission vector corresponding to the vector y is calculated by using a difference between a value of a product of a value of a corresponding distance of the lattice point $\bar{u}(i,k)$ obtained in step S603, that is, the submatrix that includes elements from the first column to the $i_0$-th column of the second sub-upper triangular matrix $uR[i_0]$, and the lattice point $\bar{u}(i,k)$ with respect to the transformed second sub-vector $y'_{[2]}$ in distance, and a value of a product of the submatrix that includes elements from the first column to the $i_0$-th column of the second sub-upper triangular matrix $uR[i_0]$ and the lattice point u with respect to the transformed second sub-vector $y'_{[2]}$ in distance (step S605).

That is, the log-likelihood ratio $LLR_{i,k}$ of the k-th bit of the bit string corresponding to the i-th signal using the lattice point $\bar{u}(i,k)$ obtained in step S603 may be calculated using the following Equation 9.

$$LLR_{i,k} = (-1)^{u_{i,k}} \frac{\left\| [y'_1 \ldots y'_{i_0}]^t - uR[i_0](1:i_0)\bar{u}(i,k) \right\|^2 - \left\| [y'_1 \ldots y'_{i_0}]^t - uR[i_0](1:i_0)u \right\|^2}{2\sigma^2} \quad \text{[Equation 9]}$$

Next, a hard decision and a soft decision may be determined by transforming the method of detection of a signal shown in FIG. 9.

Figure 15:
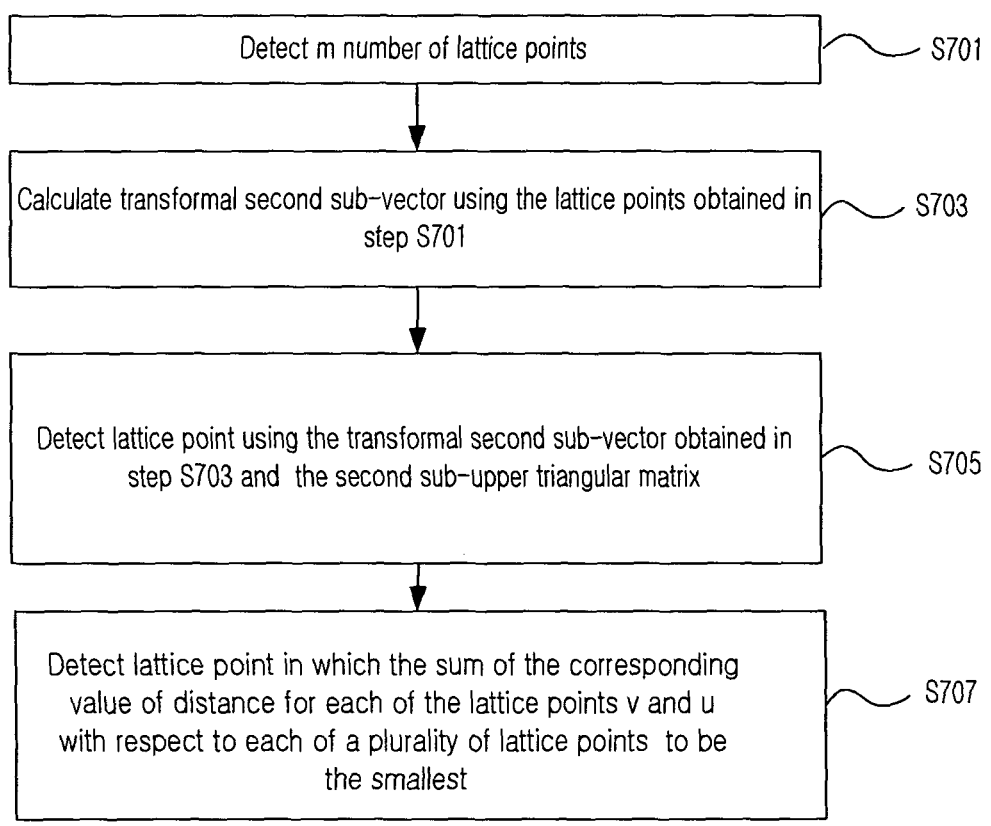
FIG. 15 is a flowchart illustrating another example of step S109 shown in FIG. 9 by applying the flowcharts shown in FIGS. 10 and 11.

FIG. 15 is a flowchart illustrating another example of step S109 shown in FIG. 9 by applying the flowcharts shown in FIGS. 10 and 11.

Referring to FIG. 15, a plurality of (m number of) lattice points v[l] in which the value of a product of the first sub-upper triangular matrix $bR[i_0]$ and the lattice point v[l] to be detected is equal to or less than the value of a distance of a predetermined reference value with respect to the first sub-vector $y_{[1]}$ is detected (step S701).

The plurality of lattice points v[l] that are close to the matrix $[y_{i_0+1} \ldots y_M]^t$ corresponding to the first sub-upper triangular matrix $bR[i_0]$ are detected. That is, $[x_{i_0+1} \ldots x_M]^t$ is detected using (1) of Equation 4. Particularly, m number of lattice points including a point that has the smallest value of $\|[y_{i_0+1} \ldots y_M]^t - bR[i_0][x_{i_0+1} \ldots x_M]^t\|^2$ and a point that has the value immediately larger than the smallest value of $\|[y_{i_0+1} \ldots y_M]^t - bR[i_0][x_{i_0+1} \ldots x_M]^t\|^2$ are obtained. Here, m indicates a predetermined natural number that is set beforehand. Therefore, the obtained m number of lattice points is represented as $v[l] = [v[l]_1 \ldots v[l]_{M-i_0}]^t$, $1 \leq l \leq m$.

Further, $\{v[1], v[2], \ldots, v[m]\}$ is referred to as the $\Lambda$ and the values obtained from $d(v[l]):= \|[y_{i_0+1} \ldots y_M]^t - bR[i_0]v[l]\|^2$ are stored.

Next, the transformed second sub-vector $y'_{[2]}[l]$ is obtained by eliminating the value of the product of the lattice points v[l] and the submatrix that includes elements from the ($i_0$+1)-th column to the M-th column of the second sub-upper triangular matrix $uR[i_0]$ from the second sub-vector $y_{[2]}$ (step S703).

The points of $\Lambda$ are substituted to $[x_{i_0+1} \ldots x_M]$ in (2) of Equation 4. It is assumed that $x_{i_0+1} = v[l]_i$, $1 \leq i \leq M - i_0$ (where $v[l] \in \Lambda$, $1 \leq l \leq m$) and the form $$y'_j[l] = y_j - \sum_{1 \leq i \leq M - i_0} uR[i_0]_{j(i_0+i)} v[l]_i$$

are calculated with respect to j (where $1 \leq j \leq i_0$). It can be arranged as in the following Equation 10.

$$[y'_1[l] \ldots y'_{i_0}[l]]^t = uR[i_0](1:i_0)[x_1 \ldots x_{i_0}]^t + [\eta_1 \ldots \eta_{i_0}]^t \quad \text{[Equation 10]}$$

Next, with respect to l (where $1 \leq l \leq m$), lattice points u[l] in which the value of a product of the submatrix that includes elements from the first column to the $i_0$-th column of the second sub-upper triangular matrix $uR[i_0]$ and the lattice point u[l] has the smallest value of distance with respect to the transformed second sub-vector $y'_{[2]}[l]$ are detected (step S705).

That is, with respect to l (where $1 \leq l \leq m$) a smallest point obtained from the form of $\bar{d}_1([x_1 \ldots x_{i_0}]^t) = \|[y'_1[l] \ldots y'_{i_0}[l]]^t - uR[i_0](1:i_0)[x_1 \ldots x_{i_0}]^t\|^2$ is calculated using Equation 10 and the calculated smallest point is referred to as u[l].

Next, a lattice point $$\begin{bmatrix} u[l_0] \\ v[l_0] \end{bmatrix}$$

in which the sum of the corresponding value of distance $d(v[l]) + \bar{d}_1(u[l])$ for each of the lattice points v and u with respect to each of a plurality of lattice points $$\begin{bmatrix} u[l] \\ v[l] \end{bmatrix}$$

detected by repeating step S703 and step S705 for the plurality of lattice point v[l] detected in step S701 is minimized is selected (step S707).

That is, the form $d(v[l]) + \bar{d}_1(u[l])$ (where $1 \leq l \leq m$) is compared and the lattice point in which the value of $d(v[l]) + \bar{d}_1(u[l])$ is smallest is selected to output $$\hat{x} = \begin{bmatrix} u[l_0] \\ v[l_0] \end{bmatrix}$$

as the signal transmission vector with respect to the vector.

Figure 16:
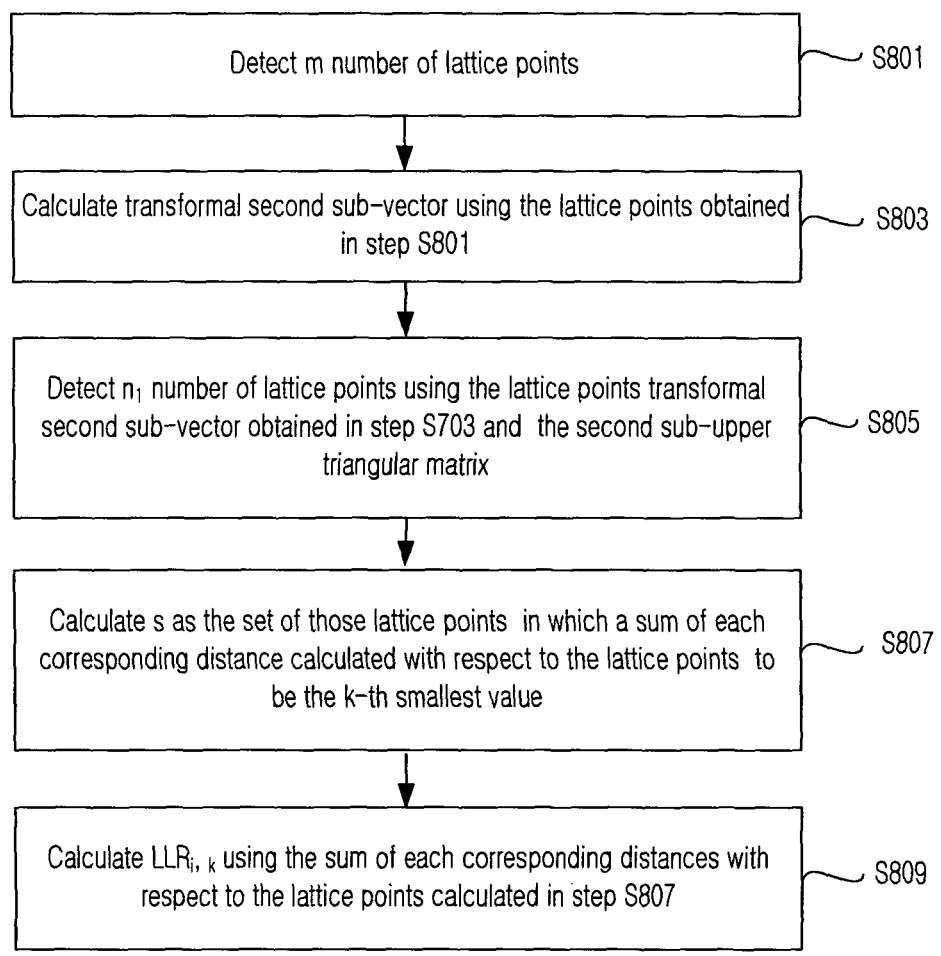
FIG. 16 is a flowchart illustrating a method of calculating the log-likelihood ratio according to another example of step S109 by applying the flowcharts shown in FIGS. 10 and 11.

FIG. 16 is a flowchart illustrating a method of calculating the log-likelihood ratio according to another example of step S109 by applying the flowcharts shown in FIGS. 10 and 11.

Referring to FIG. 16, the plurality of (m number of) lattice points v[l] in which a value of a product of the first sub-upper triangular matrix $bR[i_0]$ and the desired lattice point with respect to the first sub-vector $y_{[1]}$ in distance is equal to or less than the predetermined reference value are detected (step S801).

That is, among the lattice points included in the space $D_1$, the m number of points each having a small value of $d([x_{i_0+1} \ldots x_M]) = \|[y_{i_0+1} \ldots y_M]^t - bR[i_0][x_{i_0+1} \ldots x_M]^t\|^2$ are determined and stored on the basis of the form (1) of Equation 4. The set of the obtained lattice points is indicated by a symbol $\Lambda$. $\Lambda$ includes the lattice point having the smallest value of $d(\bullet)$ and the other m−1 number of lattice points are points until the m-th point other than the smallest point when sequentially arranging the lattice points calculated to search the lattice point having the smallest value of d(•).

The points included in Λ, that is, the values corresponding to {v[1], v[2], . . . , v[m]}, are stored. Further, the points included in Λ are defined as v[l] where $1 \leq l \leq m$.

Next, the transformed second sub-vector $y'_{[2]}[l]$ is obtained by eliminating the value of a product of the lattice points v[l] and the submatrices from the $(i_0+1)$-th column to the M-th column of the second sub-upper triangular matrix $uR[i_0]$ from the second sub-vector $y_{[2]}$ (step S803).

The points of Λ are substituted to $[x_{i_0+1} \ldots x_M]$ in the form (2) of Equation 4. That is, it is assumed that $x_{i_0+1}=v[l]_i$, $1 \leq i \leq M-i_0$ (where $v[l] \in \Lambda$, $1 \leq l \leq m$), and the form $$y'_j[l] = y_j - \sum_{1 \leq i \leq M-i_0} uR[i_0]_{j(i_0+i)} v[l]_i$$

is calculated with respect to j (where $1 \leq j \leq i_0$).

Next, the plurality of lattice points u[l][h] in which the value of a product of the submatrix that includes elements from the first column to the $i_0$-th column of the second sub-upper triangular matrix $uR[i_0]$ and the lattice point with respect to the transformed second sub-vector $y'_{[2]}[l]$ in distance is equal to or smaller than the predetermined reference value are detected (step S805).

That is, with respect to each l (where $1 \leq l \leq m$), $n_1$ number of lattice points in which the distance value corresponds to the predetermined reference value are detected with reference to the following Equation 11. The value of $n_1$ with respect to l is a predetermined natural number. The $n_1$ number of points are represented as $\Lambda_1$. $\Lambda_1$ includes the point having the smallest value of $\bar{d}_1(\bullet)$, and the other $n_1-1$ number of points are points until the $n_1$-th point other than the smallest point when sequentially arranging the points calculated to search the point having the smallest value of $\bar{d}_1(\bullet)$.

The values of $\bar{d}_1(\bullet)$ with respect to the points included in the $\Lambda_1$ are stored.

$$\bar{d}_1([x_1 \ldots x_{i_0}]^t) = \|[y_1^t[l] \ldots y_{i_0}'[l]]^t - uR[i_0](1:i_0)[x_1 \ldots x_{i_0}]^t\|^2 \quad \text{[Equation 11]}$$

Here, each coordinate of $[x_1 \ldots x_{i_0}]^t$ is one of $2^Q$ number of integral numbers, and each exists in the $i_0$-dimensional space $D_2$.

Next, it is calculated from the lattice point in which the result of $$f\begin{pmatrix} u[l][h] \\ v[l] \end{pmatrix} = \bar{d}_l(u[l][h]) + d(v[l]), \quad u[l][h] \in \Lambda_l$$

becomes the smallest value to the lattice point in which the result of $$f\begin{pmatrix} u[l][h] \\ v[l] \end{pmatrix} = \bar{d}_l(u[l][h]) + d(v[l]), \quad u[l][h] \in \Lambda_l$$

becomes the k-th smallest value, and then the set of those lattice points $$S = \begin{bmatrix} u[l][h] \\ v[l] \end{bmatrix}$$

is calculated (step S807). That is, on the basis of Λ, $\Lambda_1, \ldots, \Lambda_m$ obtained in step S805, the numerical formula $f(u,v[l]) = \bar{d}_l(u) + d(v[l])$ is calculated with respect to l ($1 \leq l \leq m$) for each $u \in \Lambda_l$. The points corresponding from the smallest f(•) value to the k-th smallest f(•) value are stored. The symbol K indicates the natural number predetermined by considering the size of capable memory or the amount of calculation. The set of above-described obtained k number of points is set as S.

Next, the log-likelihood ratio $LLR_{i,k}$ of the k-th bit $x_{i,k}$ of the bit string corresponding to the i-th signal is calculated using the sum of each corresponding distances $$\left( f\begin{pmatrix} u[l][h] \\ v[l] \end{pmatrix} = \bar{d}_l(u[l][h]) + d(v[l]) \right)$$

calculated with respect to the plurality of lattice points $$x = \begin{bmatrix} u[l][h] \\ v[l] \end{bmatrix}$$

and the value α(i,k) to which the log is applied to the previous probability ratio of each bit (step S809).

That is, when calculating the LLR for the signal to be detected in a signal repeating receiver, if it is assumed that the k-th bit of the bit string corresponding to the i-th signal of the transmission signal vector is denoted as $x_{i,k}$, the LLR value of the $x_{i,k}$ is denoted as $LLR_{i,k}$, and the value to which the log is applied to the previous probability ratio of the corresponding bit to be input for calculating the LLR is denoted as α(i,k), the LLR of the corresponding bit may be calculated by using following Equation. 12.

$$LLR_{i,k} \approx \quad \text{[Equation 12]}$$

$$\alpha(i,k) - \frac{1}{2} \min_{x \in S, x_{i,k}=0} \left( \frac{f(x)}{\sigma^2} - \sum_{(j,s) \neq (i,k)} \alpha(j,s)(-1)^{x_{j,s}} \right) +$$

$$\frac{1}{2} \min_{x \in S, x_{i,k}=1} \left( \frac{f(x)}{\sigma^2} - \sum_{(j,s) \neq (i,k)} \alpha(j,s)(-1)^{x_{j,s}} \right)$$

On the other hand, when detecting a signal by dividing Equation 2, Equation 2 may be divided by more than three detection formulas when the number of received signal strings and the number of transmission signal strings are large as well as by dividing Equation 2 by two as in Equation 3. At this time, the method of dividing Equation 2 is the same as the method of configuring Equation 3 and Equation 4. A specific row that divides Equation 2 may be determined by considering a signal strength distribution of each column of the upper triangular matrix R of Equation 2. If the signal strength distribution of each column is not considered in the upper triangular matrix R, each of the divided relations has the same number or similar number of variables.

Figure 17:
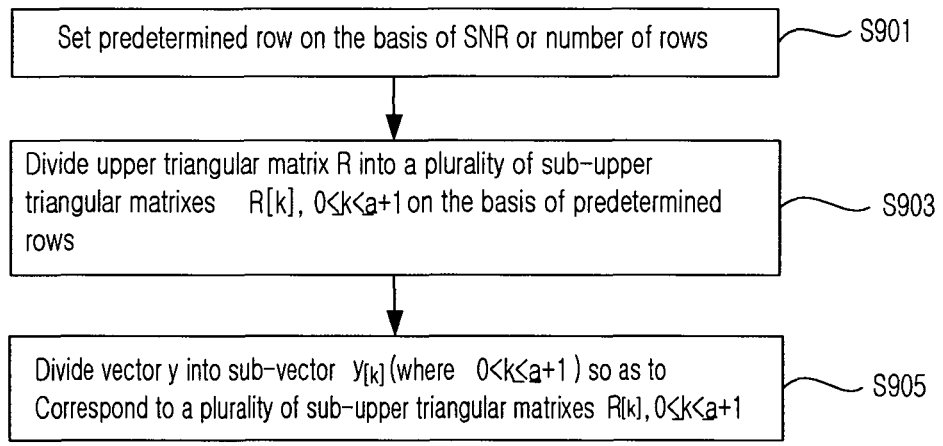
FIG. 17 is a flowchart illustrating a second example of step S107 shown in FIG. 9 in detail.

FIG. 17 is a flowchart illustrating a second example of step S107 shown in FIG. 9 in detail.

Referring to FIG. 17, in the upper triangular matrix R, a plurality of predetermined rows $i_0, i_1, \ldots, i_a$ (where $1 \leq i_0 < i_1 < \ldots < i_a < M$, and the symbol M indicates the entire number of rows of the upper triangular matrix R) determined on the basis of the SNR or the number of rows are set (step S901).

Next, the upper triangular matrix R is divided into a plurality of sub-upper triangular matrices R[k], $0 \leq k \leq a+1$ on the basis of the plurality of predetermined rows set in step S901 (step S903).

That is, when the number of rows of the upper triangular matrix R is assumed as M, the upper triangular matrix R is divided as Equation 13 with respect to the (a+1) number of natural numbers $i_0, i_1, \ldots, i_a$ (where $1 \leq i_0 < i_1 < \ldots < i_a < M$)

$$R[a+1]_{ij} := R_{(i_a+i)(i_a+j)},$$
$$1 \leq i, j \leq M - i_a$$
$$R[a]_{ij} := R_{(i_{a-1}+i)(i_{a-1}+j)},$$
$$1 \leq i \leq i_a - i_{a-1}, 1 \leq j \leq M - i_{a-1}$$
$$\vdots$$
$$R[k]_{ij} := R_{(i_{k-1}+i)(i_{k-1}+j)},$$
$$1 \leq i \leq i_k - i_{k-1}, 1 \leq j \leq M - i_{k-1}$$
$$\vdots$$
$$R[1]_{ij} := R_{(i_0+i)(i_0+j)},$$
$$1 \leq i \leq i_1 - i_0, 1 \leq j \leq M - i_0$$
$$R[0]_{ij} := R_{ij}, 1 \leq i \leq i_0, 1 \leq j \leq M$$

[Equation 13]

The vector y is divided into a plurality of sub-vectors $y_{[k]}$ (where $0 \leq k \leq a+1$) so as to correspond to the plurality of sub-upper triangular matrices R[k], $0 \leq k \leq a+1$ divided in step S903. The (a+2)-th sub-vector $y_{[0]}$ includes sub-vectors from a first row sub-vector to the $i_0$-th row sub-vector of the vector y, the (a+2-k)-th sub-vector $y_{[k]}$ (where $0 \leq k \leq a$) includes sub-vectors from the $(i_{k-1}+1)$-th row sub-vector to the $i_k$-th row sub-vector of the vector y, and the first sub-vector $y_{[a+1]}$ includes sub-vectors from the $i_a$-th row sub-vector to M-th row sub-vector of the vector y (step S905).

Figure 18:
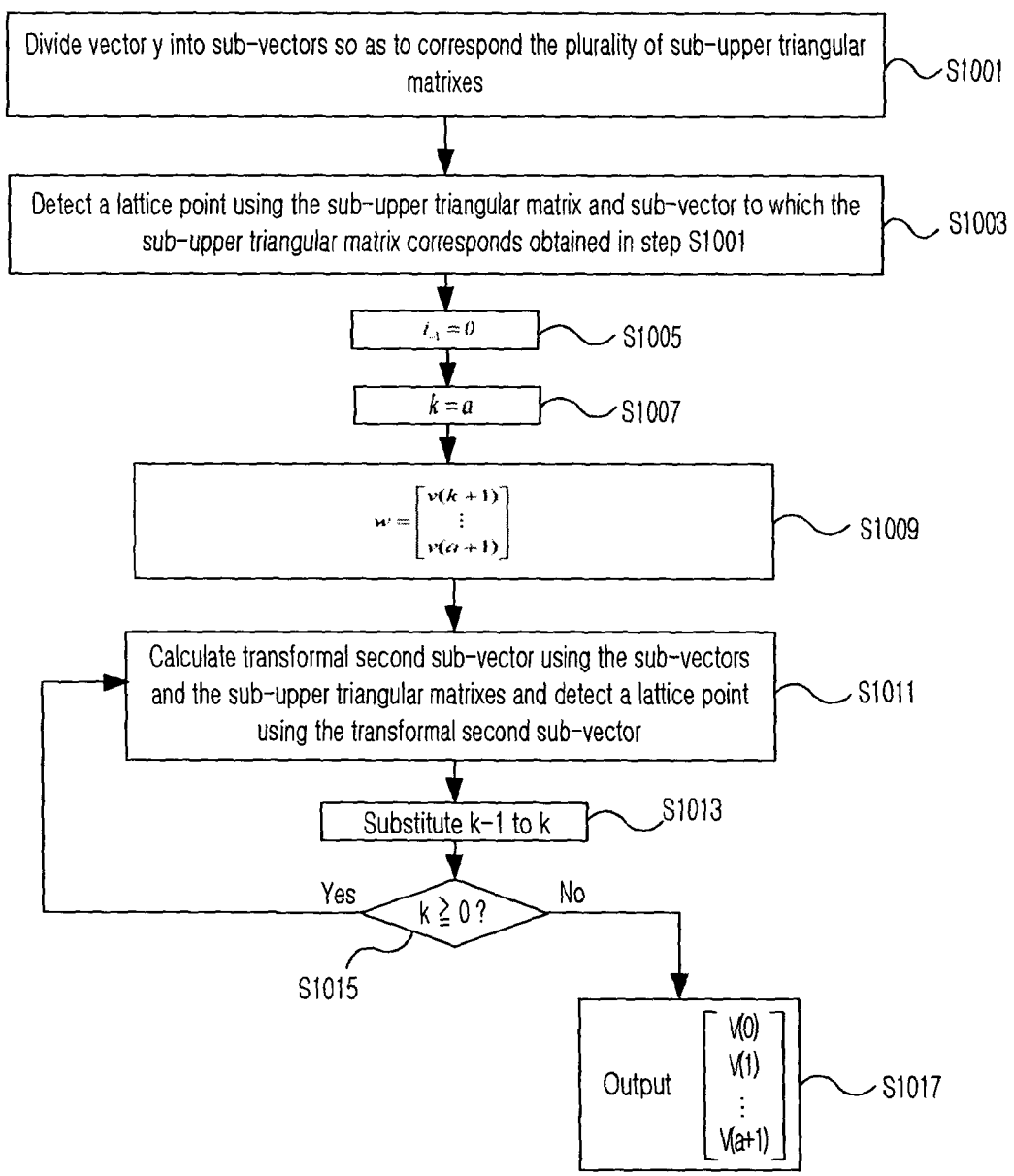
FIG. 18 is a flowchart illustrating an example of step S109 shown in FIG. 9 to which S107 shown in FIG. 17 is applied.

FIG. 18 is a flowchart illustrating a step of detecting the lattice point by using the division algorithm shown in FIG. 17.

Referring to FIG. 18, when it is assumed that the number of rows included in the upper triangular matrix R is M, the upper triangular matrix R is divided by the (a+1) number of natural numbers $i_0, i_1, \ldots, i_a$ (where $1 \leq i_0 < i_1 < \ldots < i_a < M$) (step S1001). This is the same as the division step shown in FIG. 17.

Next, a lattice point v(a+1) that is close to the divided sub-vector to which the value of the product of the sub-upper triangular matrix R[a+1] corresponds is obtained (step S1003). Here, the lattice point v(a+1) includes $M - i_a$ number of coordinates, and each of the coordinates is a vector that is one of the finite number of signal values determined by the modulation method used. In order to detect the lattice point v(a+1), one of the near ML algorithms such as the sphere decoding algorithm or the M algorithm is used.

Next, it is assumed that $i_{-1}=0$ (step S1005) and an initial value of k is set to a (step S1007). And then, the column vector $$w = \begin{bmatrix} v(k+1) \\ \vdots \\ v(a+1) \end{bmatrix}$$

in which the v(k+1)-th column vector to the v(a+1)-th column vector are sequentially arranged is obtained (step S1009).

Next, the (a+2-k)-th transformed sub-vector $y'_{[k]}$ is obtained by eliminating the value of a product of the column vector w and the submatrices from the $(i_k-i_{k-1}+1)$-th column to the $(M-i_{k-1})$-th column of the sub-upper triangular matrix R[k] from the (a+2-k)-th sub-vector $y_{[k]}$. That is, the (a+2-k)-th transformed sub-vector $y'_{[k]}$ includes signals obtained by calculating the numerical formula $$y'_j = y_j - \sum_{i_k+1 \leq l \leq M} R[k]_{j(l-i_{k-1})} w_{l-i_k}$$

with respect to all j (where $i_{k-1}+1 \leq j \leq i_k$). The lattice point v(k) in which the value of a product of the desired lattice point and the submatrices that include elements from the first column to the $(i_k-i_{k-1})$-th column of the sub-upper triangular matrix R[k] with respect to the (a+2-k)-th transformed sub-vector $y'_{[k]}$ in distance becomes the smallest value is detected (step S1011).

That is, the lattice point v(k) in which the distance between $[y'_{i_{k-1}+1} \; y'_{i_{k-1}+2} \ldots y'_{i_k}]^t$ and $R[k](1:i_k-i_{k-1})v(k)$ is sufficiently small is obtained. Here, the lattice point v(k) includes the $i_k - i_{k-1}$ number of coordinates, and each of the coordinates is one vector that is one of the finite number of signals determined by the used modulation method. Further, the matrix $R[k](1:i_k-i_{k-1})$ is composed from the first column to the $(i_k - i_{k-1})$-th column of the matrix R[k]. In order to detect the lattice point v(k), one of the near ML algorithms such as the sphere decoding algorithm or the M algorithm is used as the case of detecting the lattice point v(a+1).

Next, k−1 is substituted to k in the obtained lattice point v(k) (step S1013).

Next, k and 0 are compared in the obtained lattice point v(k) (step S1015). If the k is equal to or larger than 0, the procedure is branched to step S1009. If the k is smaller than 0 (that is, k is equal to −1), $$\begin{bmatrix} v(0) \\ v(1) \\ \vdots \\ v(a+1) \end{bmatrix}$$

is output (step S1017).

Figure 19:
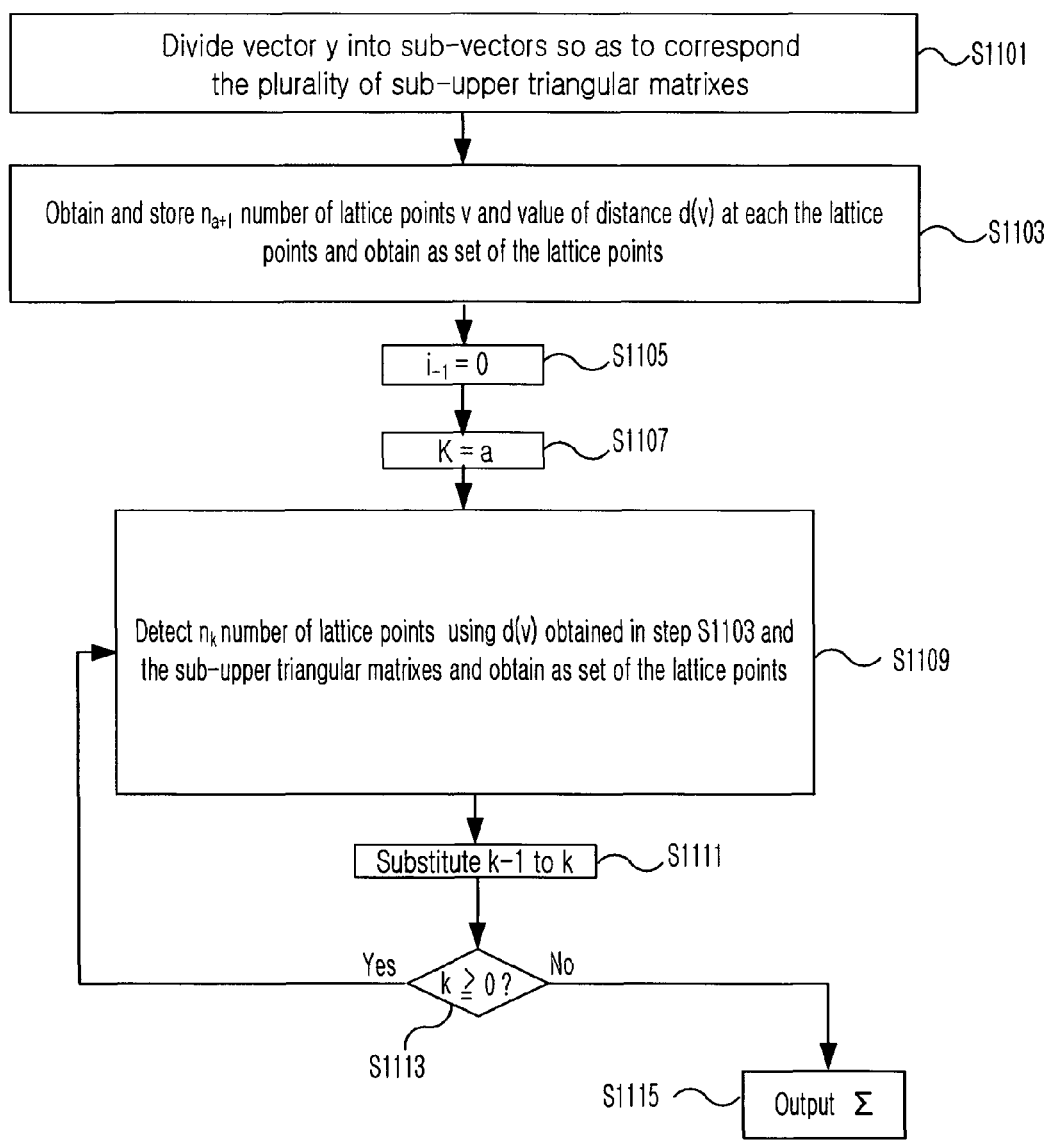
FIG. 19 is a flowchart illustrating another example of step S109 to which step S107 shown in FIG. 17 is applied.

FIG. 19 is a flowchart illustrating another method of detecting the lattice point to which the division algorithm shown in FIG. 17 is applied.

Referring to FIG. 19, when it is assumed that the number of rows included in the upper triangular matrix R is M, the upper triangular matrix R is divided on the basis of the (a+1) number of natural numbers $i_0, i_1, \ldots, i_a$ (where $1 \leq i_0 < i_1 < \ldots < i_a < M$) (step S1101).

Next, a plurality of ($n_{a+1}$ number on lattice points v in which the value of a product of the sub-upper triangular matrix R[a+1] and a desired lattice point v is equal to or less than the predetermined reference value with respect to the sub-vector $y_{[k]}$ in distance and the corresponding distance are calculated (step S1103). That is, $n_{a+1}$ number of lattice points v in which the value resulting from the numerical formula $d(v) = \|[y_{i_a+1} \ldots y_M]^t - R[a+1]v\|^2$ corresponds to the sufficiently small and the d(•) values at the corresponding lattice points are obtained and stored. It is assumed that the symbol $\Sigma$ denotes the set of $n_{a+1}$ number of points v. When the sphere decoding algorithm is used to obtain the value of the set Σ, the set Σ is composed of a point having the smallest d(•) value and $n_{a+1}-1$ number of points having the d(•) value that is immediately larger than the smallest d(•) value.

Next, $i_{-1}=0$ and k=a are set (S1105, S1107).

Next, in a case of a vector in which the lattice point v is an element of the set Σ and the lattice point u includes $(i_k-i_{k-1})$ number of coordinates each of which are a vector being one of the finite number signal values determined by the used modulation method, $n_k$ number of lattice points corresponding to a vector $$\begin{bmatrix} u \\ v \end{bmatrix}$$

having the sufficiently small $$d\left(\begin{bmatrix} u \\ v \end{bmatrix}\right)$$

value are obtained using the following Equation 14 (step S1109).

$$d\left(\begin{bmatrix} u \\ v \end{bmatrix}\right) := d(v) + \|[y_{i_{k-1}+1} y_{i_{k-1}+2} \cdots y_{i_k}]^t - \quad \text{[Equation 14]}$$
$$R[k](i_k - i_{k-1} + 1 : M - i_{k-1})v - R[k](1 : i_k - i_{k-1})u\|^2$$

That is, when the lattice point v is an element of the set Σ and a set of a plurality of lattice points having the sufficiently small $$d\left(\begin{bmatrix} u \\ v \end{bmatrix}\right)$$

value is denoted as $\Lambda_k(v)$, values in the $\Lambda_k(v)$ are stored. $\Lambda_k(v)$ is composed of a point having the smallest $$d\left(\begin{bmatrix} u \\ v \end{bmatrix}\right)$$

value and a plurality of points having the $$d\left(\begin{bmatrix} u \\ v \end{bmatrix}\right)$$

value that is immediately larger than the smallest $$d\left(\begin{bmatrix} u \\ v \end{bmatrix}\right)$$

value.

At this time, when detecting the points included in the $\Lambda_k(v)$, the point v is fixed as any point included in the set Σ. Further, the lattice points corresponding to the lattice point u are obtained using one of the methods (near ML methods) that have a similar maximum likelihood detection performance such as the sphere decoding algorithm or the M algorithm. At this time, a predetermined number of points including a point having the smallest value resulting from the formula $\|[y_{i_{k-1}+1} y_{i_{k-1}+2} \cdots y_{i_k}]^t - R[k](i_k-i_{k-1}+1:M-i_{k-1})v - R[k](1:i_k-i_{k-1})u\|^2$ are obtained. With respect to all points included in the set Σ, $n_k$ number of points having the small $$d\left(\begin{bmatrix} u \\ v \end{bmatrix}\right)$$

value in the $$\bigcup_{v \in \Sigma} \Lambda_k(v)$$

obtained after the $\Lambda_k(v)$ is calculated are selected and the selected points are set as elements of the set Σ.

Next, k−1 is substituted to k (step S1111).

Then, it is determined whether k is equal to or larger than 0 (step S1113). When k is equal to or larger than 0, the process (Equation 14) proceeds to step S1109. When k is smaller than 0, that is, k is −1, the lattice points corresponding to $\Lambda_k$ are output (step S1115). At this time, in a case of the soft decision being performed, it is set as $n_0=1$. When calculating the LLR, it is set as $n_0>1$.

On the other hand, even though not shown in the drawing, a method of detecting a transmission signal to which the above-described division detection method is applied to the predetermined L number of received signal vectors may be applied to a multi-step decoder. In this case, the basic flow is similar, but in the method of detecting a transmission signal applied to a multi-step decoder, a matrix that indicates a channel state estimated with respect to each of the plurality of received signals Y is used and may includes the following.

First, an example of dividing the upper triangular matrix R by two will be described. At this time, repeated descriptions will be omitted and just examples of the dividing step (step S107) and the detecting step (step S109) will be described.

In the step of dividing the upper triangular matrix R, each of the plurality of upper triangular matrices $R_{\{l\}}$, $1 \leq l \leq L$ are divided into the first sub-upper triangular matrices $bR_{\{l\}}[i_0]$, $1 \leq l \leq L$ which is the $(M-i_0) \times (M-i_0)$ submatrix that includes elements from the $(i_0+1)$-th column to the M-th column among from the $(i_0+1)$-th row to the M-th row and the second sub-upper triangular matrix $uR_{\{l\}}[i_0]$, $1 \leq l \leq L$ which is the $(i_0 \times M)$ submatrix that includes elements from the first column to the M-th column from among the first row to the $i_0$-th row based on the predetermined row $i_0$ determined on the basis of the SNR or the number of rows.

Next, each of the vectors $y^{\{l\}}$, $1 \leq l \leq L$ is divided into the first sub-vector $y_{[1]}^{\{l\}}$ and the second sub-vector $y_{[2]}^{\{l\}}$ so as to correspond to the divided first sub-upper triangular matrix $bR_{\{l\}}[i_0]$ and the second sub-upper triangular matrix $uR_{\{l\}}[i_0]$, respectively. The first sub-vector $y_{[1]}^{\{l\}}$, $1 \leq l \leq L$ is a sub-vector that includes elements from the $(i_0+1)$-th row to the M-th row of the vector $y^{\{l\}}$ and the second sub-vector $y_{[2]}^{\{l\}}$, $1 \leq l \leq L$ is a sub-vector that includes elements from the first row to the $i_0$-th row of the vector $y^{\{l\}}$.

Next, the lattice point $v^{\{l\}}$ in which the value of a product of the first sub-upper triangular matrix $bR_{\{l\}}[i_0]$, $1 \leq l \leq L$ and the lattice point is the closest to the first sub-vector $y_{[1]}^{\{l\}}$ in distance is detected.

Then, the value of a product of the submatrix that includes elements from the ($i_0$+1)-column to the M-th column of the second sub-upper triangular matrix $uR_{\{l\}}[i_0]$, $1 \leq l \leq L$ and the lattice point $v^{\{l\}}$ is eliminated from the second sub-vector $y_{[2]}^{\{l\}}$ so as to obtain the transformed second sub-vector $y'_{[2]}{}^{\{l\}}$.

The lattice point $u^{\{l\}}$ in which the value of product of the lattice point and the submatrix that includes elements from the first column to the $i_0$-th column of the second sub-upper triangular matrix $uR_{\{l\}}[i_0]$, $1 \leq l \leq L$ with respect to the transformed second sub-vector $y'_{[2]}{}^{\{l\}}$ in distance is the closest is then detected.

Thereafter, the log-likelihood ratio $LLR_{i+i_0,k}{}^{\{l\}}$ of the k-th bit of the ($i+i_0$)-th bit string of the vector $y^{\{l\}}$, $1 \leq l \leq L$ and the log-likelihood ratio $LLR_{i,k}{}^{\{l\}}$ of the k-th bit of the bit string corresponding to the i-th signal may be calculated using each the first sub-upper triangular matrix $bR_{\{l\}}[i_0]$, $1 \leq l \leq L$ and the second sub-upper triangular matrix $uR_{\{l\}}[i_0]$, $1 \leq l \leq L$.

More particular, the log-likelihood ratio $LLR_{i+i_0,k}{}^{\{l\}}$ of the k-th bit of the ($i+i_0$)-th bit string of the vector $y^{\{l\}}$, $1 \leq l \leq L$ is calculated using the first sub-upper triangular matrix $bR_{\{l\}}[i_0]$.

The lattice point $v^{\{l\}}=[v_1{}^{\{l\}} \ldots v_{M-i_0}{}^{\{l\}}]$ is obtained by decoding each of the repeatedly calculated log-likelihood ratios $LLR_{i+i_0,k}{}^{\{l\}}$ (where $1 \leq l \leq L$).

The log-likelihood ratio $LLR_{i,k}{}^{\{l\}}$ of the k-th bit of the bit string corresponding to the i-th signal is calculated using the obtained lattice point $v^{\{l\}}=[v_1{}^{\{l\}} \ldots v_{M-i_0}{}^{\{l\}}]$ and the second sub-upper triangular matrix $uR_{\{l\}}[i_0]$.

Next, an example of dividing the upper triangular matrix R into a plurality of submatrices will be described.

Each of the plurality of upper triangular matrices $R_{\{l\}}$, $1 \leq l \leq L$ are divided into a plurality of sub-upper triangular matrices $R_{\{l\}}[k]$ (where k is a+1, ..., 1, 0) based on the predetermined row $i_0, i_1, \ldots i_a$, $1 \leq i_0 < i_1 < \ldots < i_a < M$ determined on the basis of the SNR or the number of rows as follows:

$$R_{\{l\}}[a+1]_{ij} := R_{\{l\}(i_a+i)(i_a+j)}, 1 \leq i, j \leq M - i_a$$

$$R_{\{l\}}[a]_{ij} := R_{\{l\}(i_{a-1}+i)(i_{a-1}+j)}, 1 \leq i \leq i_a - i_{a-1}, 1 \leq j \leq M - i_{a-1}$$

$$\vdots$$

$$R_{\{l\}}[k]_{ij} := R_{\{l\}(i_{k-1}+i)(i_{k-1}+j)}, 1 \leq i \leq i_k - i_{k-1}, 1 \leq j \leq M - i_{k-1}$$

$$\vdots$$

$$R_{\{l\}}[1]_{ij} := R_{\{l\}(i_0+i)(i_0+j)}, 1 \leq i \leq i_1 - i_0, 1 \leq j \leq M - i_0$$

$$R_{\{l\}}[0]_{ij} := R_{\{l\}ij}, 1 \leq i \leq i_0, 1 \leq j \leq M$$

Next, the vector $y^{\{l\}}$ is divided into a plurality of sub-vectors $y^{\{l\}}[k]$ (where k is a+1, ..., 1, 0) so as to correspond to each of the plurality of sub-upper triangular matrices $R_{\{l\}}[k]$ (where k is a+1, ..., 1, 0). That is, the vector $y^{\{l\}}[a+1]$ is a vector that includes elements from the ($i_a$+1)-row to the m-th row of the vector $y^{\{l\}}$. When k represents one of a, ..., 1, 0, the vector $y^{\{l\}}[k]$ is a vector that includes elements from the ($i_{k-1}$+1)-th row to the $i_k$-th row of the vector $y^{\{l\}}$, and the vector $y^{\{l\}}[0]$ is a vector that includes elements from the first row to the $i_0$-th row of the vector $y^{\{l\}}$.

Next, the log-likelihood ratio vector is obtained using the max-log map algorithm on the basis of the sub-upper triangular matrix $R_{\{l\}}[a+1]$ (where $1 \leq l \leq L$) and the vector $y^{\{l\}}[a+1]$ (where $1 \leq l \leq L$). The obtained log-likelihood ratio vector is decoded so as to obtain the lattice point $v^{\{l\}}[a+1]$ (where $1 \leq l \leq L$).

When an initial value of k is set to a and the value of k sequentially decreases until the value of k reaches 0, the transformed sub-vector $y'^{\{l\}}[k]$ (where $1 \leq l \leq L$) is obtained by eliminating the value of the product of the sub-vector $$\begin{bmatrix} v^{\{l\}}[k+1] \\ \vdots \\ v^{\{l\}}[a+1] \end{bmatrix}$$

and the submatrix that includes elements from a ($i_k - i_{k-1}$+1)-th column to a ($M - i_{k-1}$)-th column of the sub-upper triangular matrix $R_{\{l\}}[k]$ (where $1 \leq l \leq L$) from the sub-vector $y^{\{l\}}[k]$ (where $1 \leq l \leq L$).

The above-described exemplary embodiments of the present invention are not limited to the above-described method and apparatus. The invention may be implemented by a program that causes implementation of functions corresponding to the structure of the exemplary embodiments of the present invention or a recording medium storing the program, and may be easily implemented on the basis of the above-described exemplary embodiments.

It is to be understood that the invention is not limited to the disclosed embodiments, but, on the contrary, is intended to cover various modifications and equivalent arrangements included within the spirit and scope of the appended claims.

According to the embodiments described above, there are advantages that the calculation process may be partially adjusted in accordance with target signal detection accuracy.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A computer-implemented method of detecting a transmission signal from a received signal in a multiple input multiple output (MIMO) system, the method comprising executing computer program code instructions to cause one or more computer processors to:
   obtain a unitary matrix Q and a triangular matrix R by performing a sorted QR-decomposition (SQRD) algorithm with respect to a matrix B indicating a channel state;
   calculate a vector y by multiplying a transpose matrix $Q^t$ of the unitary matrix Q by the received signal Y;
   divide the triangular matrix R into a plurality of sub triangular matrices; and
   divide the calculated vector y into a plurality of sub-vectors so as to correspond to the divided plurality of sub triangular matrices; and
   detect a lattice point corresponding to each of the divided sub-vectors using the divided plurality of sub triangular matrices.

2. The method of detecting a transmission signal of claim 1, wherein the triangular matrix R is an upper triangular matrix and dividing of the upper triangular matrix R includes:
   dividing the upper triangular matrix R into a first sub-upper triangular matrix $bR[i_0]$ which is a ($M-i_0$)×($M-i_0$) matrix and a second sub-upper triangular matrix $uR[i_0]$ which is a ($i_0$×M) matrix on the basis of a predetermined row $i_0$ determined on the basis of a signal-to-noise ratio (SNR) or the number of rows; and dividing the vector y into a first sub-vector $y_{[1]}$ and a second sub-vector $y_{[2]}$ so as to correspond to the divided first sub-upper triangular matrix $bR[i_0]$ and the second sub-upper triangular matrix $uR[i_0]$, respectively.

3. The method of detecting a transmission signal of claim 2, wherein the first sub-upper triangular matrix $bR[i_0]$, in a matrix composed of row vectors that include elements from an $(i_0+1)$-th row to which the predetermined row is increased by one to an M-th row which is the last row of the upper triangular matrix R, is an $(M-i_0) \times (M-i_0)$ matrix composed of column vectors corresponding to column numbers larger than $i_0+1$; and the second sub-upper triangular matrix $uR[i_0]$ is an $(i_0 \times M)$ matrix composed of row vectors that include elements from a first row to an $i_0$-th row of the upper triangular matrix R.

4. The method of detecting a transmission signal of claim 2, wherein the detecting of the lattice point includes:

detecting a lattice point v in which a value of a product of the first sub-upper triangular matrix $bR[i_0]$ and the lattice point v in distance is the closest to the first sub-vector;

obtaining a transformed second sub-vector $y'_{[2]}$ by eliminating the value of a product of the submatrix that includes elements from the $(i_0+1)$-th column to the M-th column of the second sub-upper triangular matrix $uR[i_0]$ the lattice point v from the second sub-vector $y_{[2]}$; and detecting a lattice point u in which the value of a product of the submatrix that includes elements from the first column to the $i_0$-th column of the second sub-upper triangular matrix $uR[i_0]$ and the lattice point u in distance is the closest to the transformed second sub-vector $y'_{[2]}$.

5. The method of detecting a transmission signal of claim 4, further comprising:

after the detecting of the lattice point, calculating a log-likelihood ratio (LLR) corresponding to the first sub-vector $y_{[1]}$ using the lattice point v and a max-log map algorithm; and calculating a log-likelihood ratio corresponding to the second sub-vector $y_{[2]}$ using the lattice point u and the max-log map algorithm.

6. The method of detecting a transmission signal of claim 5, wherein the calculating of the log-likelihood ratio corresponding to the second sub-vector $y_{[2]}$ includes, with respect to each k-th bit of a bit string of an $(i+i_0)$-th signal (where $1 \leq i \leq M-i_0$) of the signal transmission vector:

inverting a value of the k-th bit of the bit string corresponding to an i-th signal of the lattice point v;

obtaining the lattice point $\bar{v}(i,k)$ in which the value of a product of the first sub-upper triangular matrix $bR[i_0]$ and the lattice point with respect to the first sub-vector $y_{[1]}$ in distance is the closest from among $(M-i_0)$-degree lattice points having the bit value obtained by inverting the value of the k-th bit as a bit value of the k-th bit of the bit string of the i-th signal; and obtaining the log-likelihood ratio $LLR_{i+i_0,k}$ of the k-th bit of the bit string corresponding to the $(i+i_0)$-th signal of the signal transmission vector corresponding to the vector y using a difference between a value of the obtained lattice point $\bar{v}(i,k)$ and a value of the product of the first sub-upper triangular matrix $bR[i_0]$ and the lattice point v with respect to the first sub-vector $y_{[1]}$ in distance.

7. The method of detecting a transmission signal of claim 5, wherein the calculating of the log-likelihood ratio, with respect to each i (where $1 \leq i \leq i_0$) of the k-th bit of the bit string of the i-th signal of the signal transmission vector, includes:

inverting a value of the k-th bit of the bit string corresponding to the i-th signal of the lattice point u;

obtaining a lattice point $\bar{u}(i,k)$ in which a value of a product of the submatrix that includes elements from a first column to an $i_0$-th column of the second sub-upper triangular matrix $uR[i_0]$ and the lattice point with respect to the transformed second sub-vector $y'_{[2]}$ in distance is the closest from among $i_0$-degree lattice points having the inverted bit value as a value of the k-th bit of the bit string of the i-th bit string; and obtaining a log-likelihood ratio $LLR_{i,k}$, as a corresponding value of distance of the obtained lattice point $\bar{u}(i,k)$, of the k-th bit of the bit string corresponding to the i-th signal of the signal transmission vector corresponding to the vector y using a difference between a value of a product of the submatrix that includes elements from the first column to the $i_0$-th column of the second sub-upper triangular matrix $uR[i_0]$ and the lattice point $\bar{u}(i,k)$ with respect to the transformed second sub-vector $y'_{[2]}$ in distance and a value of a product of the submatrix that includes elements from the first column to the $i_0$-th column of the second sub-upper triangular matrix $uR[i_0]$ and the lattice point u with respect to the transformed second sub-vector $y'_{[2]}$ in distance.

8. The method of detecting a transmission signal of claim 2, wherein the detecting of the lattice point includes:

detecting a plurality of lattice points v[l] in which a value of a product of the first sub-upper triangular matrix $uR[i_0]$ and the desired lattice point with respect to the first sub-vector $y'_{[1]}$ in distance is less than a predetermined reference value;

obtaining a plurality of transformed second sub-vectors $y'_{[2]}[l]$ by eliminating a value of a product of the submatrix that includes elements from the $(i_0+1)$-th column to the M-th column of the second sub-upper triangular matrix $uR[i_0]$ and the lattice point v[l] from the second sub-vector $y_{[2]}$ by using the plurality of lattice points v[l];

detecting the lattice point u[l] in which the value of a product of the submatrix that includes elements from the first column to the $i_0$-th column of a second sub-upper triangular matrix $uR[i_0]$ and the desired lattice point with respect to each of the plurality of transformed second sub-vectors $y'_{[2]}[l]$ in distance becomes the smallest; and selecting a lattice point $$\begin{bmatrix} u[l_0] \\ v[l_0] \end{bmatrix}$$

in which a corresponding value of distance with respect to the plurality of lattice points $$\begin{bmatrix} u[l] \\ v[l] \end{bmatrix}$$

that include the detected plurality of lattice points v[l] and the detected lattice point u[l] becomes the smallest, the value of distance being a sum of a value of a product of the first sub-upper triangular matrix $bR[i_0]$ and the lattice point v[l] with respect to the first sub-vector $y_{[1]}$ in distance and a value of a product of the submatrix that includes elements from the first column to the $i_0$-th column of the second sub-upper triangular matrix uR[$i_0$] and the lattice point u[l] with respect to the transformed second sub-vector y'$_{[2]}$[l] in distance.

9. The method of detecting a transmission signal of claim 2, wherein the detecting of the lattice point includes:
   detecting a plurality of (m number of) lattice points v[l] in which the product of the first sub-upper triangular matrix bR[$i_0$] and the lattice point with respect to the first sub-vector y$_{[1]}$ in distance is equal to or less than a predetermined reference value;
   obtaining the plurality of (m number of) transformed second sub-vectors y'$_2$[l] by eliminating a value of a product of the submatrix that includes elements from the ($i_0$+1)-th column to the M-th column of the second sub-upper triangular matrix uR[$i_0$] and the lattice point v[l] from the second sub-vector y$_{[2]}$ using the plurality of (m number of) lattice points v[l]; and
   detecting a plurality of lattice points u[l][h] in which the product of the submatrix that includes elements from the first column to the $i_0$-th column of the second sub-upper triangular matrix uR[$i_0$] and the plurality of (m number of) transformed second sub-vectors y'$_2$[l] in distance is equal to or less than the predetermined reference value.

10. The method of detecting a transmission signal of claim 2, further comprising:
   after the detecting of the lattice point, calculating the log-likelihood ratio LLR$_{i,k}$ of the k-th bit x$_{i,k}$ of the bit string corresponding to the i-th signal by using a sum $$f\begin{pmatrix} u[l][h] \\ v[l] \end{pmatrix} = \overline{d}_l(u[l][h]) + d(v[l])$$

of each value of distance calculated with respect to the detected plurality of lattice points $$\begin{bmatrix} u[l][h] \\ v[l] \end{bmatrix}$$

and a value α(i,k) to which the log operation is performed with respect to a previous probability ratio of each bit.

11. The method of detecting a transmission signal of claim 1, wherein the triangular matrix R is an upper triangular matrix and the dividing of the upper triangular matrix R and dividing the calculated vector y include:
   dividing the upper triangular matrix R into a plurality of sub-upper triangular matrices R[k] (where 0≤k≤a+1) on the basis of a plurality of predetermined rows ($i_0$, $i_1$, ..., $i_a$, 1≤$i_0$<$i_1$< ... <$i_a$<M, where M indicates the entire number of rows of the upper triangular matrix R) determined on the basis of the SNR or the number of rows using the following equation, $$R[a+1]_{ij} := R_{(i_a+i)(i_a+j)}, \ 1 \le i, j \le M - i_a$$

$$R[a]_{ij} := R_{(i_{a-1}+i)(i_{a-1}+j)}, \ 1 \le i \le i_a - i_{a-1}, 1 \le j \le M - i_{a-1}$$

$$\vdots$$

$$R[k]_{ij} := R_{(i_{k-1}+i)(i_{k-1}+j)}, \ 1 \le i \le i_k - i_{k-1}, 1 \le j \le M - i_{k-1}$$

$$\vdots$$

-continued $$R[1]_{ij} := R_{(i_0+i)(i_0+j)}, \ 1 \le i \le i_1 - i_0, 1 \le j \le M - i_0$$

$$R[0]_{ij} := R_{ij}, \ 1 \le i \le i_0, 1 \le j \le M; \quad \text{and}$$

dividing the vector y into a plurality of sub-vectors y$_{[k]}$ (where 0≤k≤a+1) so as to correspond to the divided plurality of sub-upper triangular matrices R[k] (where 0≤k≤a+1), in which an (a+2)-th sub-vector y$_{[0]}$ includes elements from a first row to the $i_0$-th row of the vector y, an (a+2-k)-th sub-vector y$_{[k]}$ (where 1≤k≤a) includes elements from an ($i_{k-1}$+1)-th row to an ($i_k$)-th row of the vector y, and the first sub-vector y$_{|a+1|}$ includes elements from an $i_a$-th row to the M-th row of the vector y.

12. The method of detecting a transmission signal of claim 11, wherein the detecting of the lattice point further includes:
   obtaining a lattice point v(a+1) in which a value of a product of the sub-upper triangular matrix R[a+1] and the desired lattice point is closest to the first sub-vector y$_{[a+1]}$;
   substituting a to k as an initial value when $i_{-1}$=0;
   obtaining a column vector $$w = \begin{bmatrix} v(k+1) \\ \vdots \\ v(a+1) \end{bmatrix}$$

in which column vectors corresponding from a {v(k+1)}-th column to a {$v^{(a+1)}$}-th column are sequentially arranged as the obtained vectors;
   obtaining the (a+2-k)-th transformed sub-vector y'$_{[k]}$ by eliminating a value of a product of the submatrix that includes elements from an ($i_k$-$i_{k-1}$+1)-th column to an (M-$i_{k-1}$)-th column of the sub-upper triangular matrix R[k] and the column vector w from the (a+2-k)-th sub-vector y$_{[k]}$;
   obtaining the lattice point $v^{(k)}$ in which a value of a product of the submatrix that includes elements from the first column to a ($i_k$-$i_{k-1}$)-th column of the sub-upper triangular matrix R[k] and the desired lattice point is the smallest with respect to the (a+2-k)-th sub-vector y$_{[k]}$ in distance; and
   substituting k−1 into k and repeating the obtaining of the column vector $$w = \begin{bmatrix} v(k+1) \\ \vdots \\ v(a+1) \end{bmatrix}$$

to the obtaining of the lattice point v(k) if k is equal to or larger than 0 and outputting a lattice point $$\begin{bmatrix} v(0) \\ v(1) \\ \vdots \\ v(a+1) \end{bmatrix}$$

if k is −1.

13. The method of detecting a transmission signal of claim 11, wherein the detecting of the lattice point further includes:

obtaining the plurality of ($n_{a+1}$ number of) lattice points v in which a value of a product of the sub-upper triangular matrix R[a+1] and the desired lattice point with respect to the first sub-vector $y_{[a+1]}$ is less than the predetermined reference value and a value of a corresponding distance d(v), and defining a set of the plurality of ($n_{a+1}$ number of) lattice points v as $\Sigma$;

substituting a to k as an initial value when $i_{-1}=0$.

detecting a plurality of lattice points u with respect to the lattice points v included in the set $\Sigma$, a sum of a value of a product of the submatrix that includes elements from an $\{(i_k-i_{k-1})+1\}$-th column to an $(M-i_{k-1})$-th column of the sub-upper triangular matrix R[k] and the lattice point v and a value of a product of the submatrix that includes elements from the first column to an $(i_k-i_{k-1})$-th column of the sub-upper triangular matrix R[a+1] and the lattice point u being equal to or less than a predetermined reference value with respect to a value of distance d(u) on the basis of the (a+2-k)-th sub-vector $y_{[k]}$, and simultaneously detecting $n_k$ number of lattice points $$\begin{bmatrix} u \\ v \end{bmatrix}$$

in which a sum of a value of a distance d(v) and a value of a distance $\underline{d}(u)$ is equal to or less than the predetermined reference value;

defining the sum of the value of the distance d(v) and the value of the distance $\underline{d}(u)$ as $$d\left(\begin{bmatrix} u \\ v \end{bmatrix}\right)$$

and defining a set of the $n_k$ number of lattice points $$\begin{bmatrix} u \\ v \end{bmatrix}$$

as $\Sigma$; and substituting k−1 to k and repeating the detecting of the plurality of lattice points u and the defining when k is equal to or larger than 0 or outputting the set $\Sigma$ when k is −1.

14. The method of detecting a transmission signal of claim 1, wherein the process of obtaining the unitary matrix Q and the upper triangular matrix R decomposes $$\begin{bmatrix} B \\ \sigma I_M \end{bmatrix}$$

by the SQRD algorithm where $\sigma$ is the reciprocal of the square root of a signal-to-noise ratio measured in a receiving terminal of the MIMO system and $I_M$ is the identity matrix with the size of the signal vector to be detected.

15. The method of detecting a transmission signal of claim 1, wherein the process of obtaining the unitary matrix Q and the upper triangular matrix R rearranges the columns of the matrix B, representing the channel state, in increasing order of the Euclidean norms of the columns and then applies QR decomposition on the rearranged matrix B.

16. The method of detecting a transmission signal of claim 1, wherein the process of obtaining the unitary matrix Q and the upper triangular matrix R rearranges the columns of the matrix B, representing the channel state, in increasing order of the Euclidean norms of the columns and then applies QR decomposition on the matrix $$\begin{bmatrix} B \\ \sigma I_M \end{bmatrix}$$

where $\sigma$ is the reciprocal of the square root of a signal-to-noise ratio measured in a receiving terminal of the MIMO system and $I_M$ is the identity matrix with the size of the signal vector to be detected.

* * * * *